June 7, 1960 J. A. FORMBY 2,940,065

RECORD CONTROLLED RECORDING APPARATUS

Filed June 24, 1952 14 Sheets-Sheet 1

June 7, 1960 J. A. FORMBY 2,940,065

RECORD CONTROLLED RECORDING APPARATUS

Filed June 24, 1952 14 Sheets-Sheet 2

RECORD CONTROLLED RECORDING APPARATUS

Filed June 24, 1952 14 Sheets-Sheet 3

RECORD CONTROLLED RECORDING APPARATUS

Filed June 24, 1952

INVENTOR

JOHN ALBERT FORMBY

By Haseltine, Lake & Co.
AGENTS

INVENTOR
JOHN ALBERT FORMBY
By Haseltine, Lake & Co.
AGENTS

June 7, 1960 J. A. FORMBY 2,940,065

RECORD CONTROLLED RECORDING APPARATUS

Filed June 24, 1952 14 Sheets-Sheet 7

INVENTOR
JOHN ALBERT FORMBY
BY Haseltine, Lake & Co.
AGENTS

June 7, 1960 J. A. FORMBY 2,940,065

RECORD CONTROLLED RECORDING APPARATUS

Filed June 24, 1952 14 Sheets-Sheet 8

INVENTOR
JOHN ALBERT FORMBY
BY Haseltine, Lake & Co.
AGENTS

INVENTOR
JOHN ALBERT FORMBY
BY Kaultino, Fabry & Co
AGENTS

RECORD CONTROLLED RECORDING APPARATUS

Filed June 24, 1952 14 Sheets-Sheet 10

INVENTOR
JOHN ALBERT FORMBY
By Hazeltine, Lake & Co
AGENTS

INVENTOR
JOHN ALBERT FORMBY
BY Hazeltine, Lake & Co
AGENTS

INVENTOR
JOHN ALBERT FORMBY
BY Haseltine, Lake & Co.
AGENTS

RECORD CONTROLLED RECORDING APPARATUS

Filed June 24, 1952 14 Sheets-Sheet 13

INVENTOR
JOHN ALBERT FORMBY
BY Haseltine, Lake + Co
AGENTS

June 7, 1960 J. A. FORMBY 2,940,065

RECORD CONTROLLED RECORDING APPARATUS

Filed June 24, 1952 14 Sheets-Sheet 14

INVENTOR
JOHN ALBERT FORMBY
By Hazeltine, Lake & Co.
AGENTS

United States Patent Office 2,940,065

Patented June 7, 1960

2,940,065

RECORD CONTROLLED RECORDING APPARATUS

John Albert Formby, 66 Oxford Road, Moseley, Birmingham, England

Filed June 24, 1952, Ser. No. 295,367

Claims priority, application Great Britain June 26, 1951

11 Claims. (Cl. 340—174)

This invention relates to record controlled recording apparatus and provides a means of sorting or grouping recorded matter without involving any physical redisposition of documents or of the original records of the matter in question. For example the present invention provides means of effecting in a continuous automatic manner, without the use of cards or the like, the accountancy operations of grouping, sorting and collating.

According to the present invention data from which there is to be sorted or selectively extracted items for recording as a distinctive set of data, e.g. data appropriate to matter affecting a predetermined person or subjet as distinct from the general data on the record affecting a variety of persons or subjects, is recorded in the form of symbols on a constantly moving transmitting record member, the symbols being of such a character that they function distinctively, in accordance with the appropriate predetermined persons or subjects or combination thereof to which they are allotted, to transmit signals in the form of electric impulses to activate means adjustable selectively to respond effectively to the influence of a selected one or more of said impulses so as to be activated to transmit by suitable means such as a reproducing or like head to a rotary recorder only the items associated with the selected form of symbol or symbols where it, or they occur on the transmitting record member, said transmission of impulses to the recorder being controlled by the selected form of symbol or symbols on the continuously moving transmitting record so that the operation of the said reproducing or like head is intermittent to obtain on the recorder a substantially continuous succession of records of items appropriate to a given smybol or symbols, the data accumulated on the said recorder thereafter being then transmitted to a receiving recorder member by the continuous rotation and travel of the first mentioned recorder and receiving recorder respectively.

Further in accordance with the invention a means is provided of selective reproduction of recorded information from a given set of recorded information using an electronic selective device. It is assumed that information is recorded on magnetic material in sets or "items," so that each item consists of a definite number of symbols (say thirty), followed by a gap of definite length (say equivalent to two symbols), each symbol consisting of a magnetic pattern of characteristic frequency (according to a code) which may be modulated by a second characteristic frequency, each symbol occupying the same length of magnetic track. There are normally ten primary frequencies representing the ten digits and letters or other symbols are represented by modulations of these, the mean amplitudes of all signals being substantially the same. In addition, "null" symbols or "blanks" are represented by a special frequency provided for the purpose. The selective device is such that it will select only those items in respect of which, symbols having prescribed symbol positions within the item have prescribed values. Thus, for example, the device might be set to select only those items in which the third symbol has a value 7. Such items, selected from a transmitting magnetic member, are reproduced on a magnetic transit recorder, which may be in the form of a drum in such a manner that there are no gaps in the record corresponding to the unselected items, that is to say, the selected items are recorded on the transit recorder, hereafter referred to as a drum in compact form. In the preferred form of the invention there are ten selective devices, each of which may be associated with a transit drum. Thus, it is possible to effect ten independent selective processes simultaneously, so that, for example, setting all the devices to operate with respect to the third symbol of an item, all those items for which the third symbol is a "0" may be reproduced on the first transit drum, all those for which the third symbol is a "1" may be reproduced on the second transit drum, and so on, so that every item may be selected by one or other of the selective devices and reproduced. The apparatus may then be set to reproduce from each of the transit drums successively on to a magnetic receiving member, so that the totality of the original items are reproduced, but in a new sequence. The transmitting and receiving members are interchangeable, and, in fact, may be identical, so that, by repetition of this process, erasing records which are no longer required and operating each time on a different symbol position within the item, the items may be sorted into any desired sequence in terms of the symbol values recorded therein.

Alternatively, a multiplicity of selective devices (say six) may operate in conjunction with each other and in relation to a single transit drum, so that an item is selected if, and only if, the symbols in a multiplicity of prescribed positions within the item have prescribed values. Thus, for example, it would be possible to select only those items for which the third symbol is a 2, the fourth a 7, the fifth a 6, the eighth a 3, the ninth a 9 and the twelfth a 4, recording them in compact form on a transit drum and thereafter reproducing them on a receiving member.

Since the number of items to be recorded on a particular transit drum will not, in general, be exactly predictable, provision is made for an additional transit drum to be brought into action by means of a micro-limit switch whenever one of the transit drums associated with a selective device becomes filled with recorded matter.

As it may sometimes be desirable that sequences of two or more items should be treated as a single item for the purpose of selection and reproduction, a means of modifying the selective devices, controllable by a manual switch, is provided to achieve this object.

An important feature of the apparatus is that gaps one, two, or three item lengths may be provided by switching, following each group of items on the receiving member. In order that such gaps may be preserved in the course of successive operations, it is also provided that if one or more gaps appear on the transmitting member, these gaps are reproduced on each of the transit drums associated with a selective device.

A further important provision is that reproduction on a receiving member may be suppressed if there is a record already there and postponed until a gap is reached, when reproduction can occur. Further, if groups of items are followed by two or three item length gaps, suppression of recording may be caused to apply everywhere except in the first gap following a recorded item. The purpose of this arrangement is to permit items of two distinct categories to be collated on the receiving member and to permit the results of computations relating to the groups to be recorded in appropriate gaps. For example, where the items relate to transactions in accountancy, the groups on the receiving member may represent items in account number order and it may be desired to associate with each group the opening balance of that account by recording it in a gap following or preceding a group.

Provision is also made during the receiving process, for the first item from each group to be recorded on an additional transit drum, the items being so recorded in compact form.

The transmitting and receiving members referred to above are rotating drums on which recording is effected along spiral tracks. Matter sorted and collated on such a drum may be transmitted to any suitable recording medium at a remote point moving synchronously with the drum. For example, the storage medium may consist of detachable sheets of magnetic material mounted on a cylindrical surface, or sprocketed film coated with magnetic material.

In order that the invention may be more clearly understood, reference is made to the accompanying drawings which illustrate by way of example one embodiment thereof.

Figure 1A:
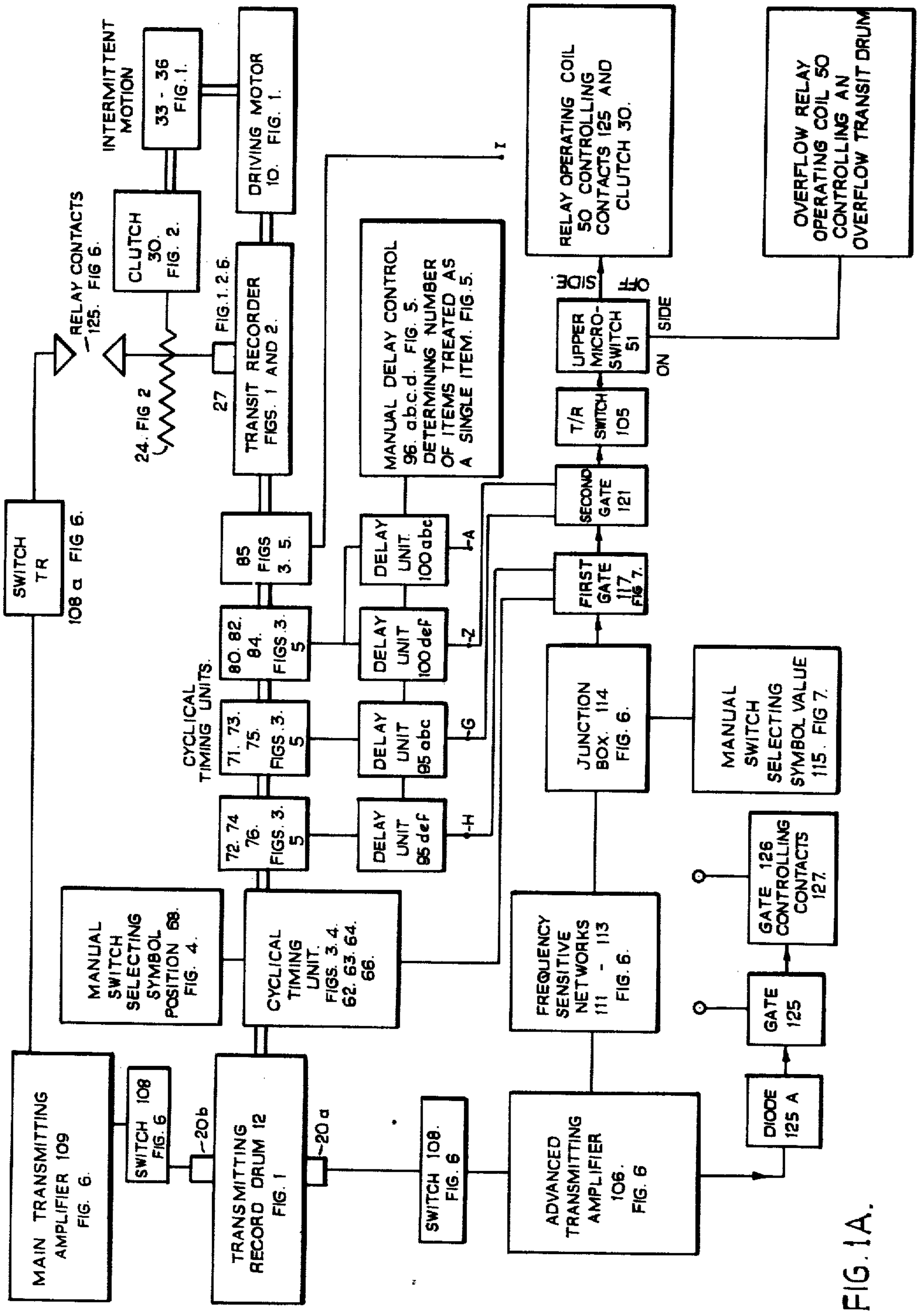
Figure 1A is a block diagram showing the normal transmitting mode of operation.
Figure 1B:
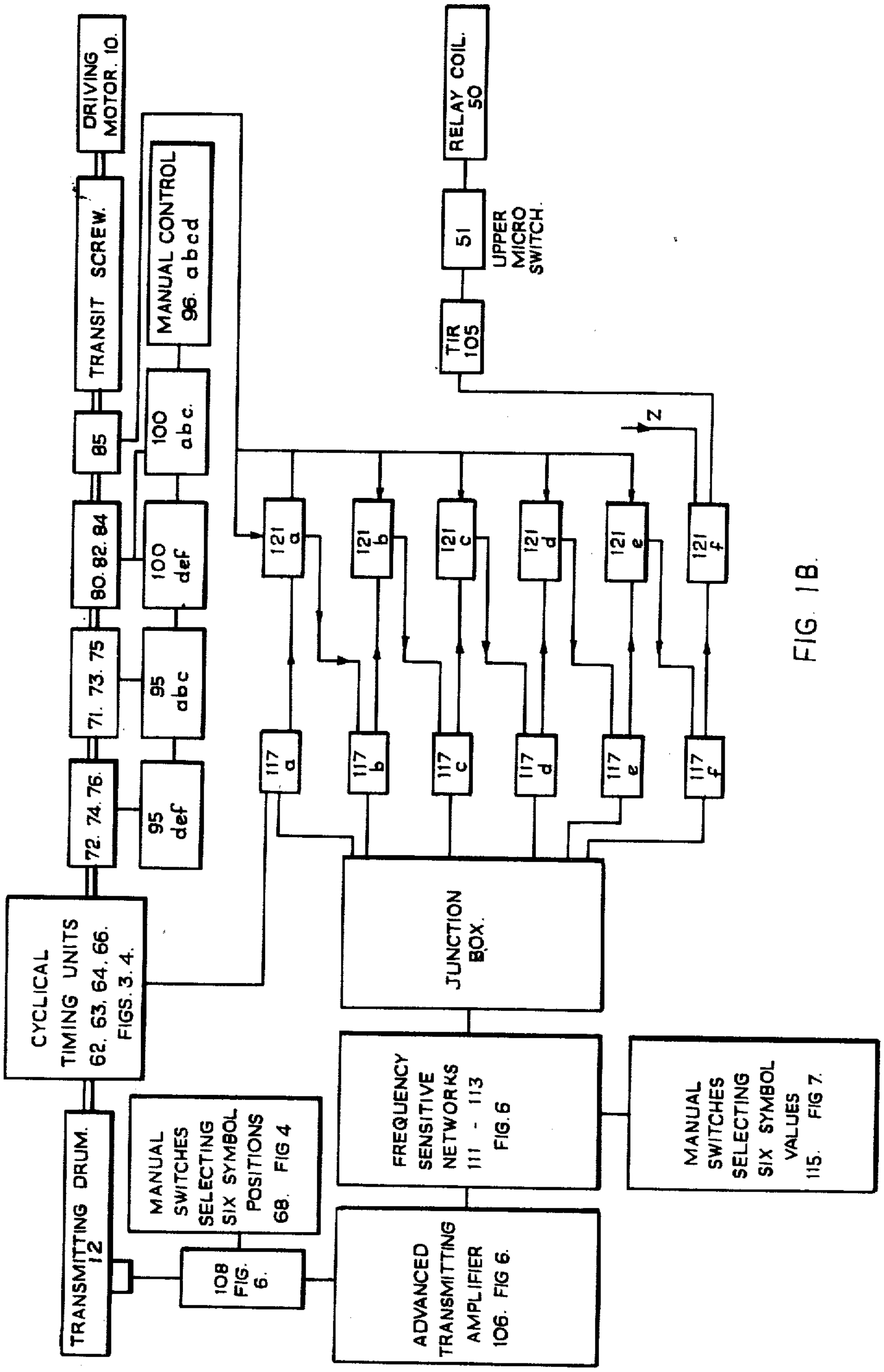
Figure 1B is a block diagram showing the special transmitting mode-gates in combination.
Figure 1C:
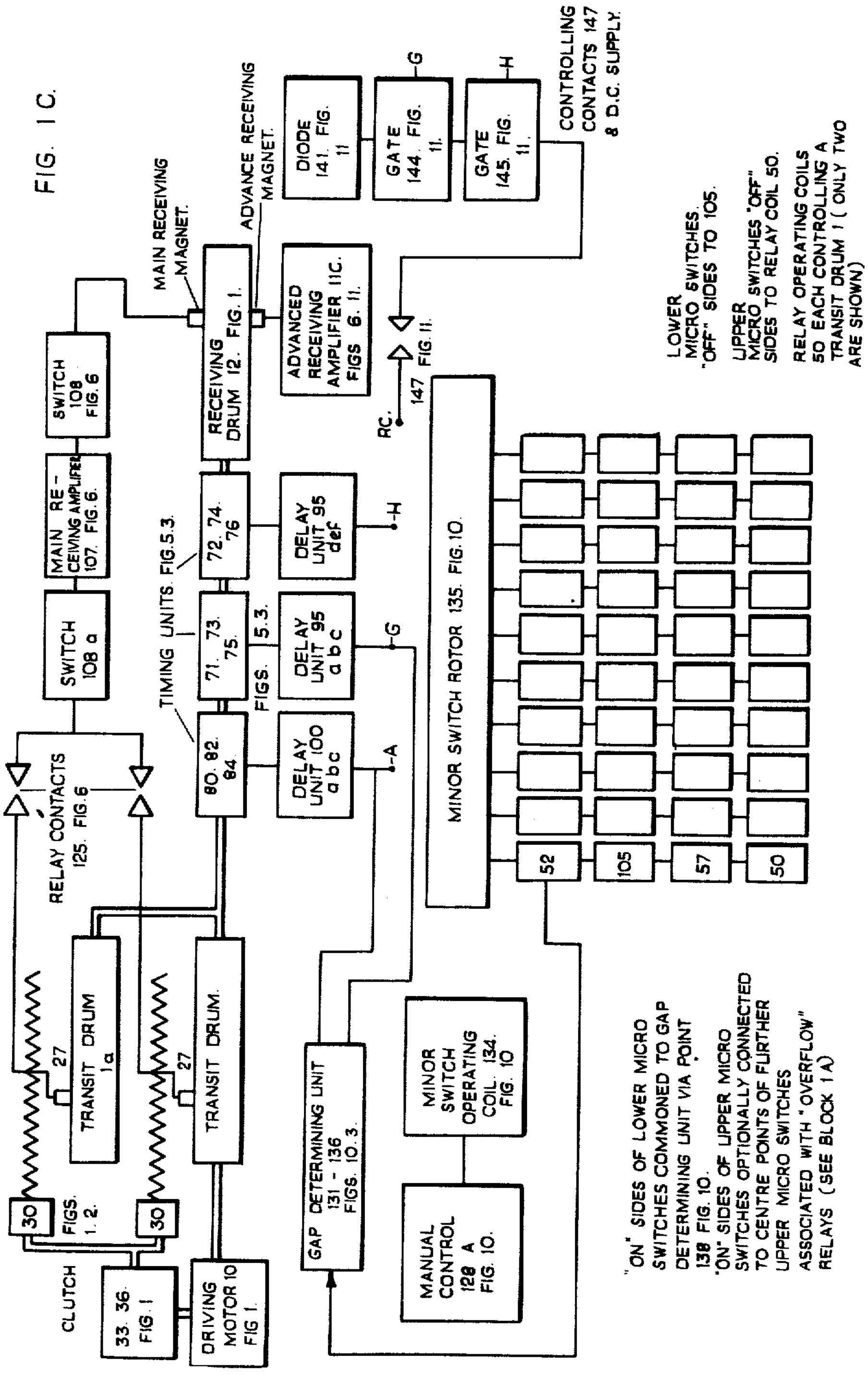
Figure 1C is a block diagram showing the receiving mode of operation.
Figure 1D:
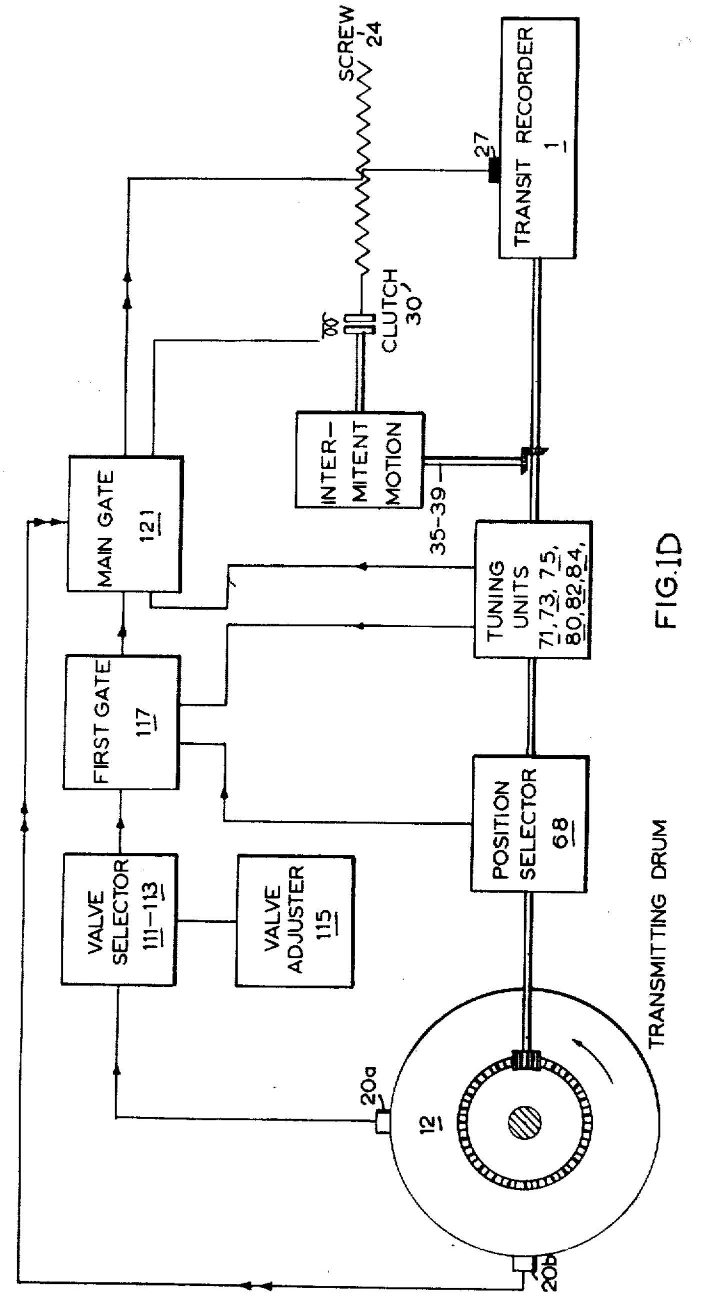
Figure 1D is a highly simplified block diagram to illustrate the normal mode of operation of the apparatus.
Figure 1E:
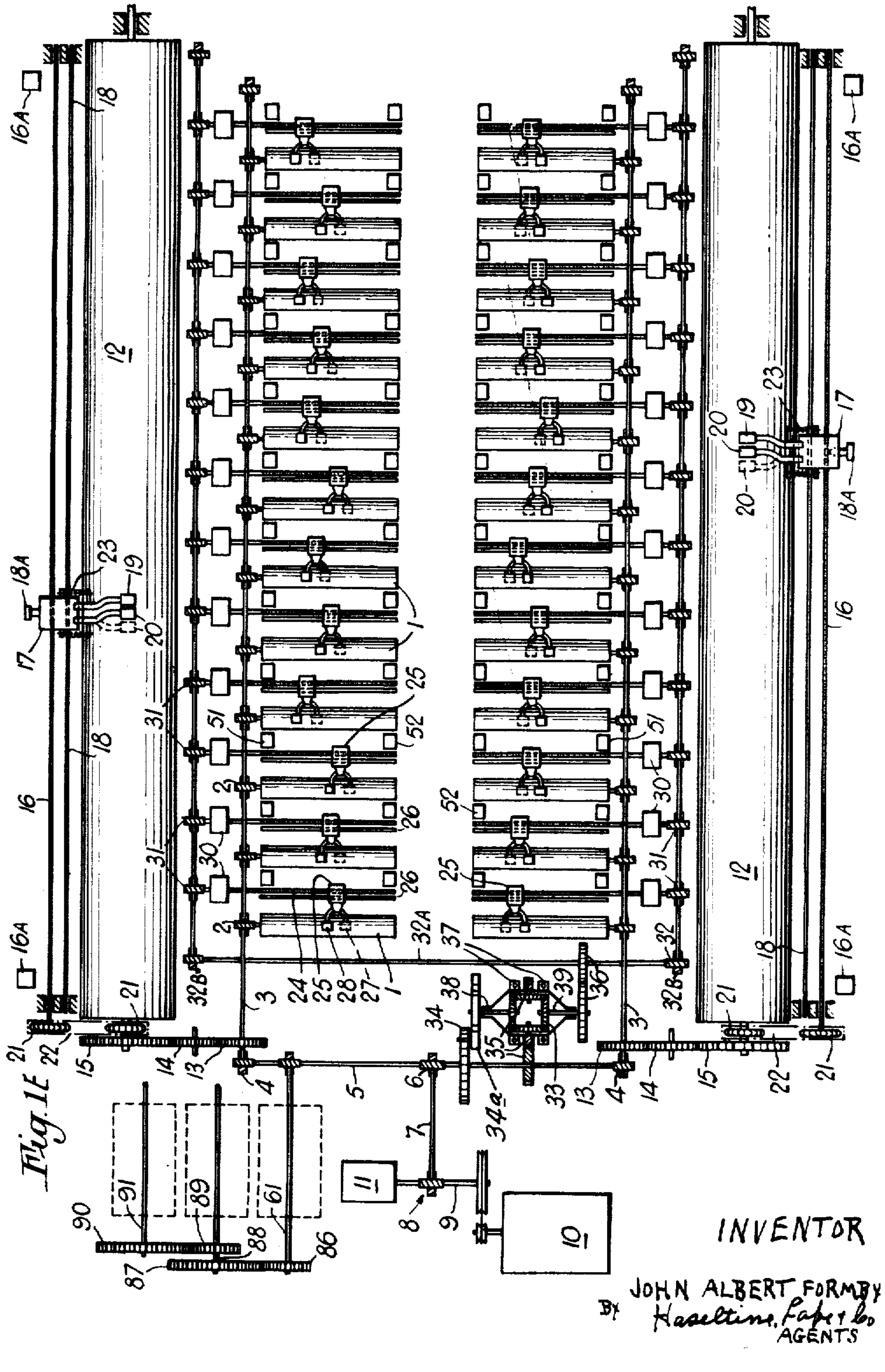

Figure 1E shows in diagrammatical form the main mechanical features of the apparatus. For convenience of illustration, all vertical shafts are shown developed in a horizontal plane. Where it is not convenient to show full details, owing to the necessarily small size of the drawings, such details are to be found in the subsequent figures.

Figure 2:
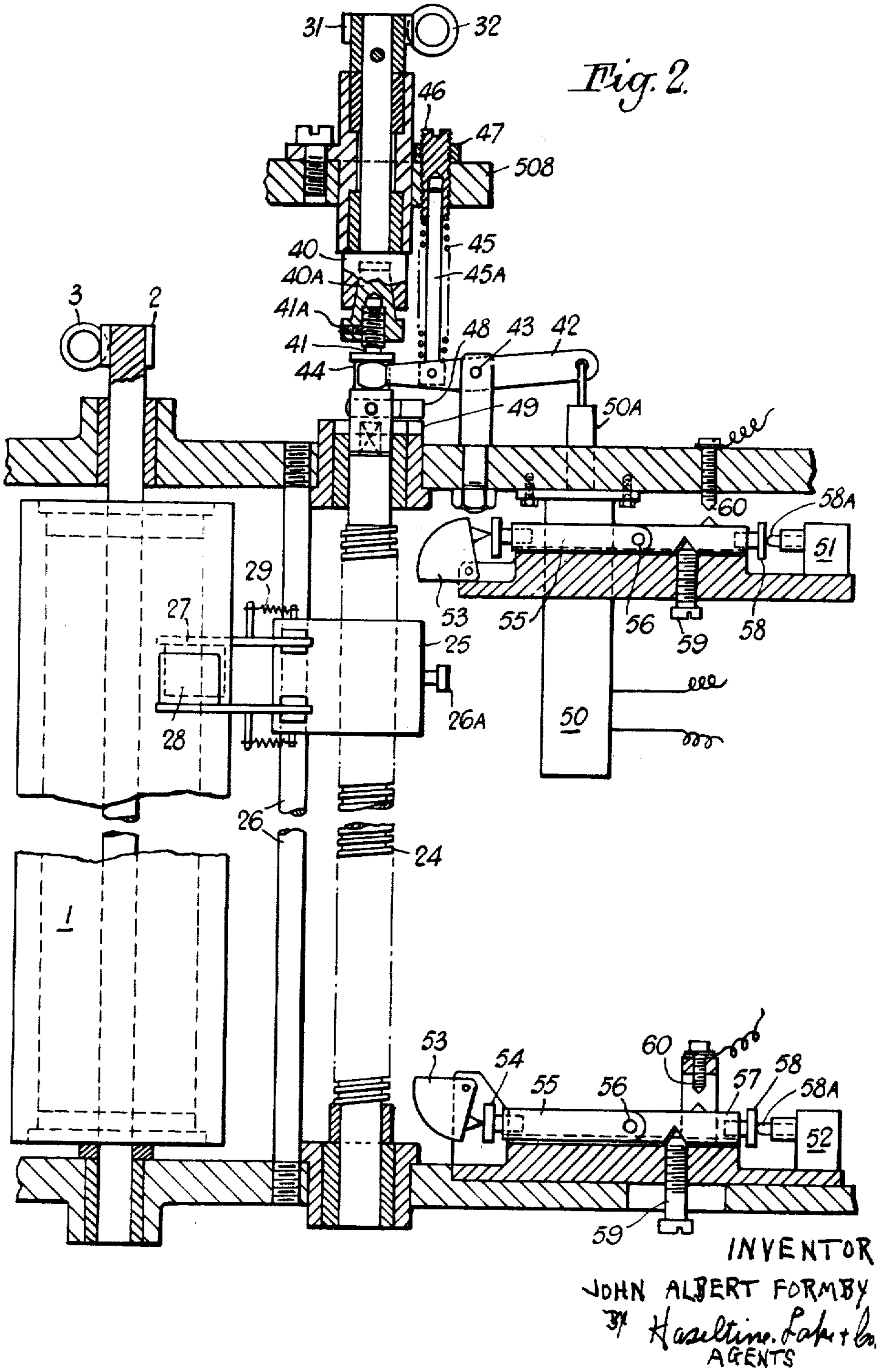

Figure 2 shows all the detail associated with a single transit drum and its associated screw, clutch, magnetic head assembly and micro-switches, there being twenty four transit drums in all, as shown in Figure 1E.

Figure 3:
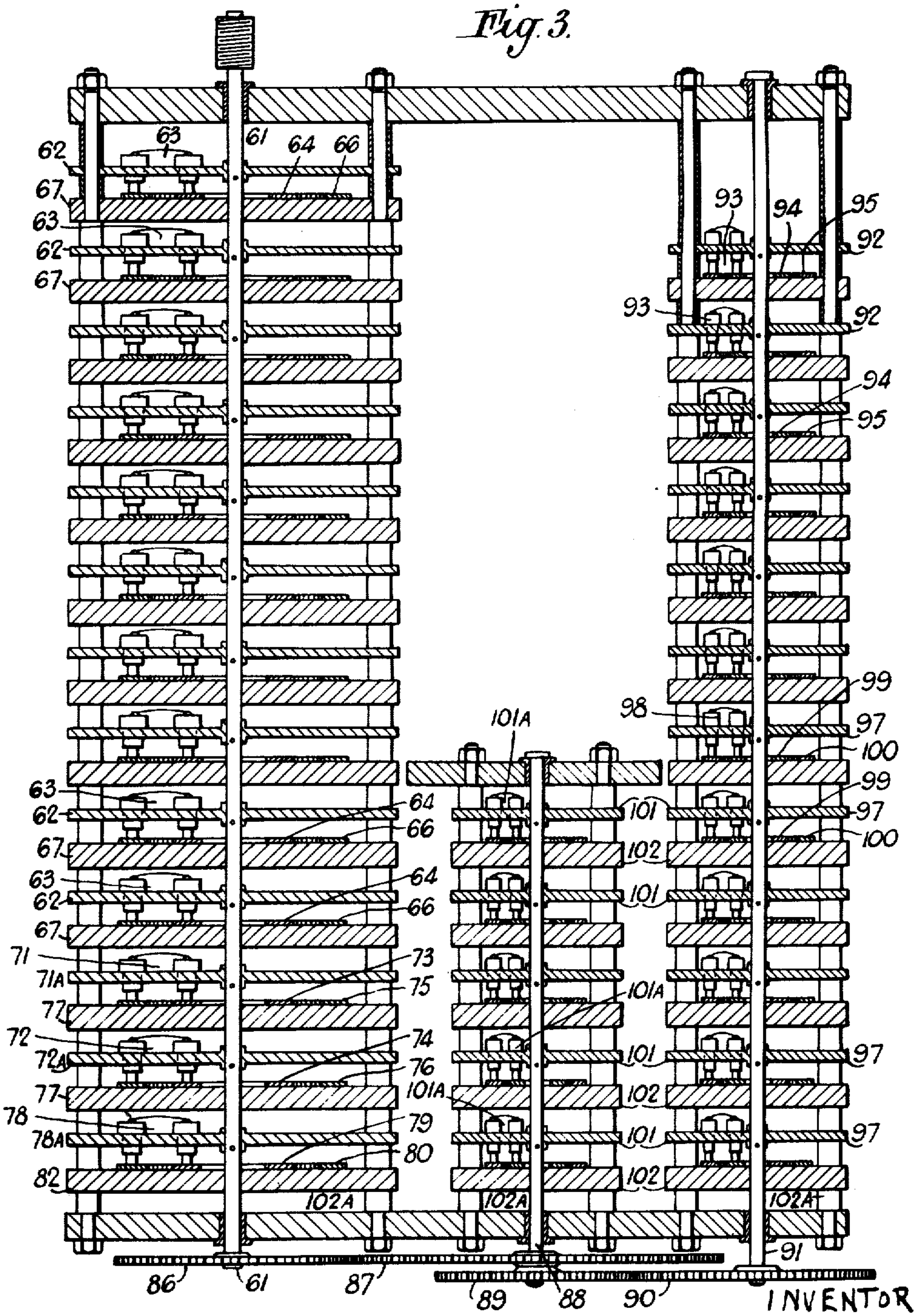

Figure 3 shows all the detail associated with shafts, only the shafts themselves and the associated spur wheels having been shown in Figure 1E.

Figure 4:
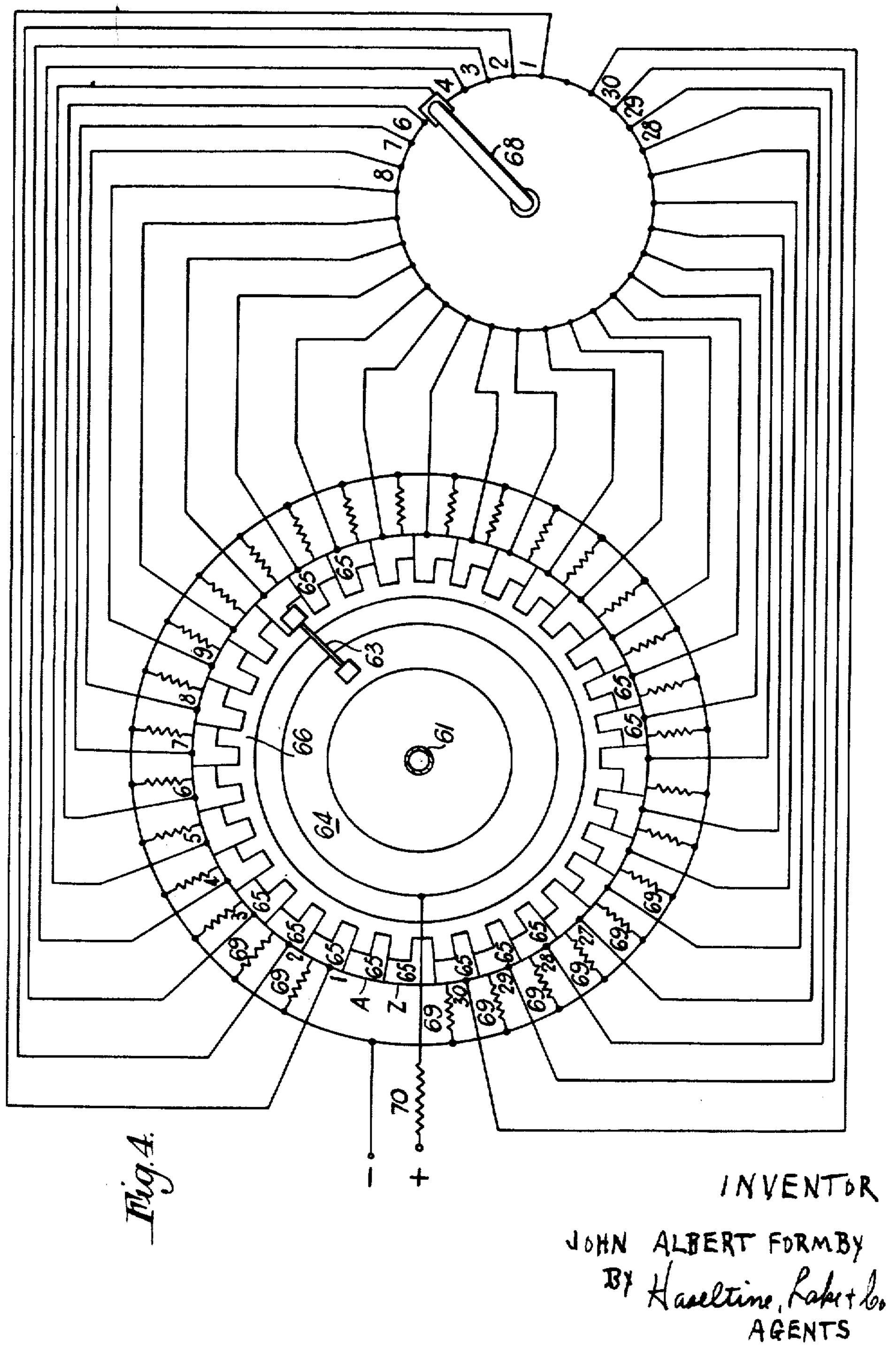

Figure 4 shows diagrammatically a single rotary scanning unit and its associated switch, being the means employed to provide an electrical signal adjustable to correspond to a selected or predetermined symbol position within an item. There are ten such units, the associated switches being shown also in Figure 6.

Figure 5:
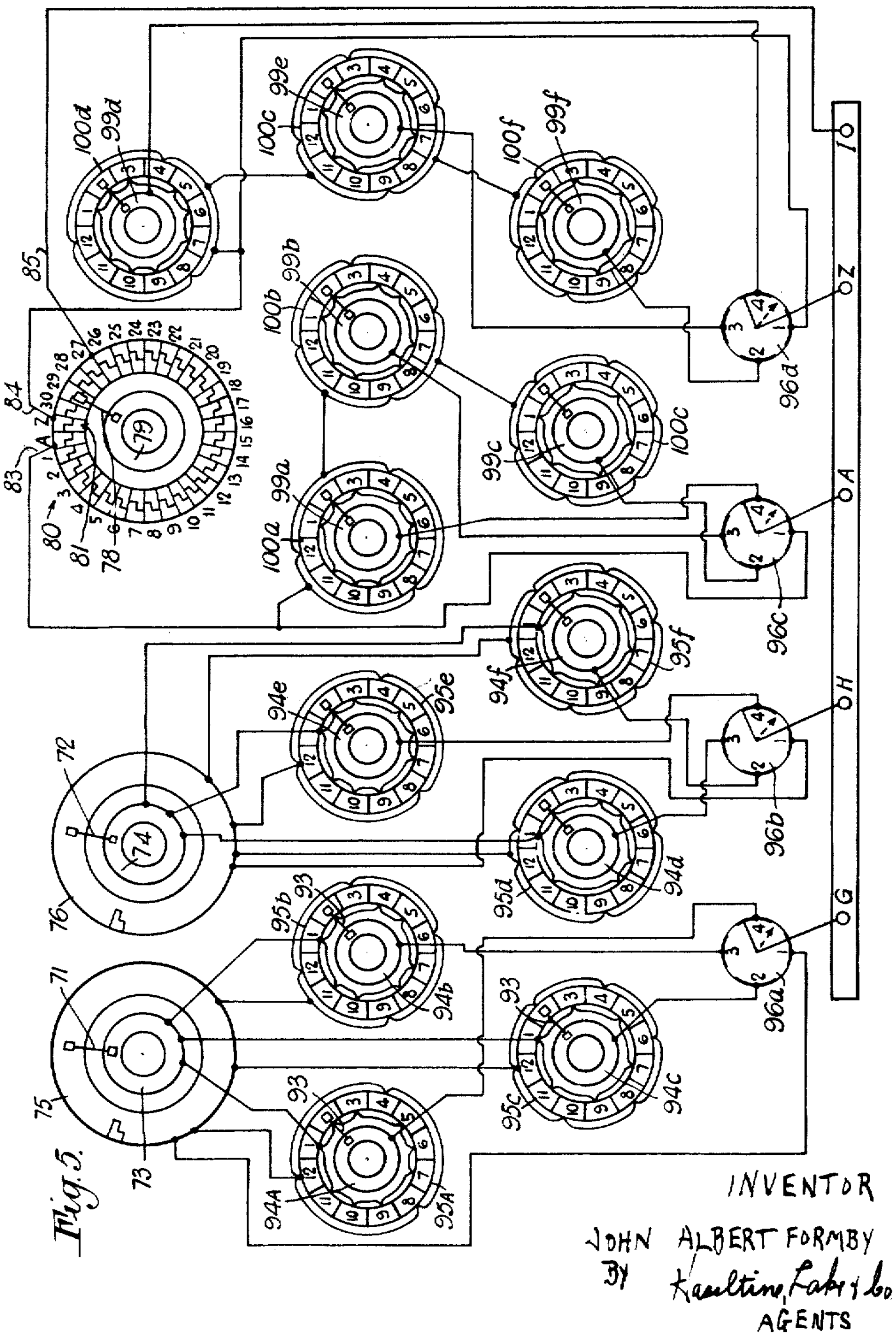
Figure 7:
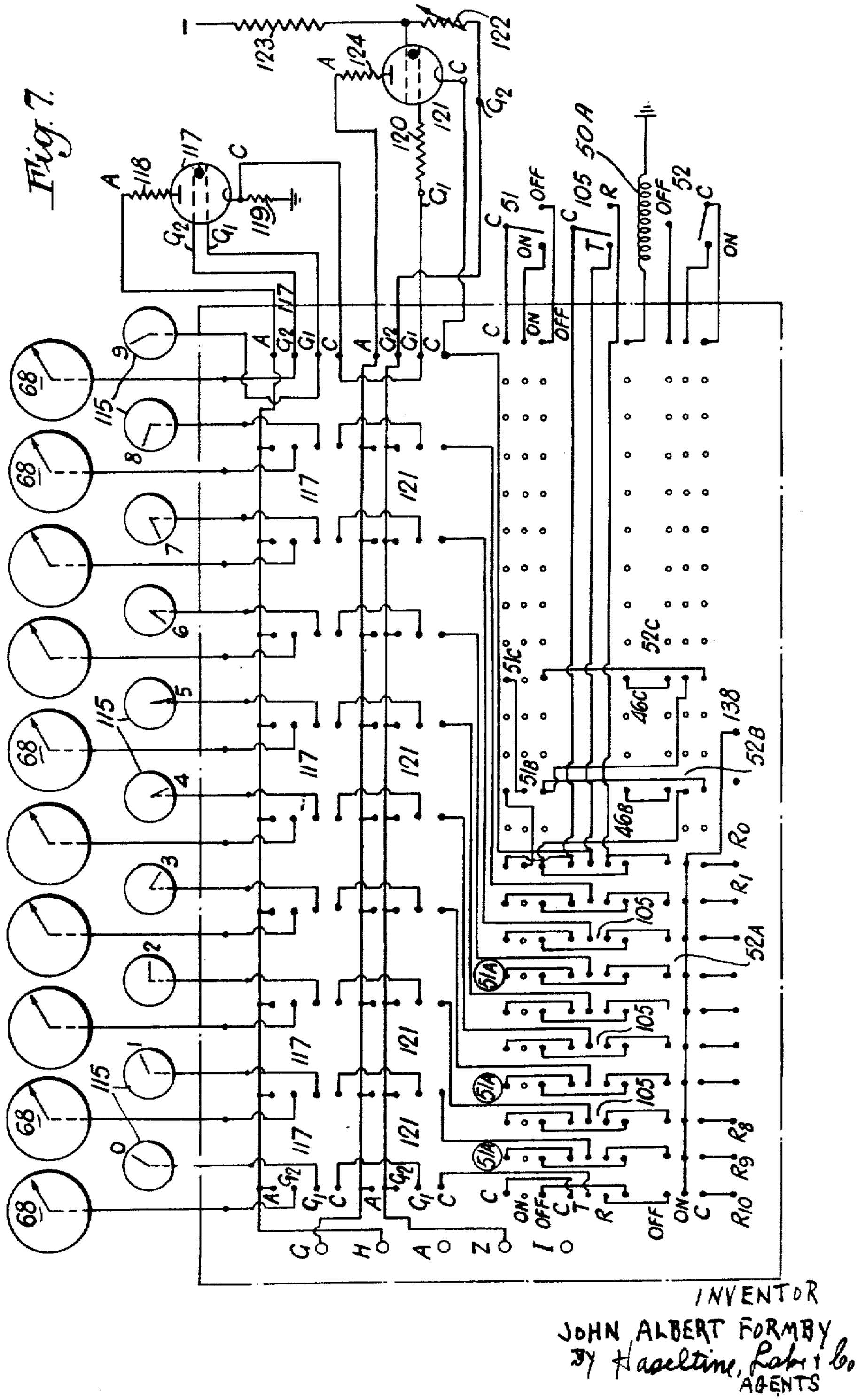

Figure 5 shows the rotary units and their electrical connections by means of which the anode 30 supplies to selector thyratrons are regulated, the five supply points G, H, A, Z, and I being brought to a plugboard shown in Figure 7.

Figure 6:
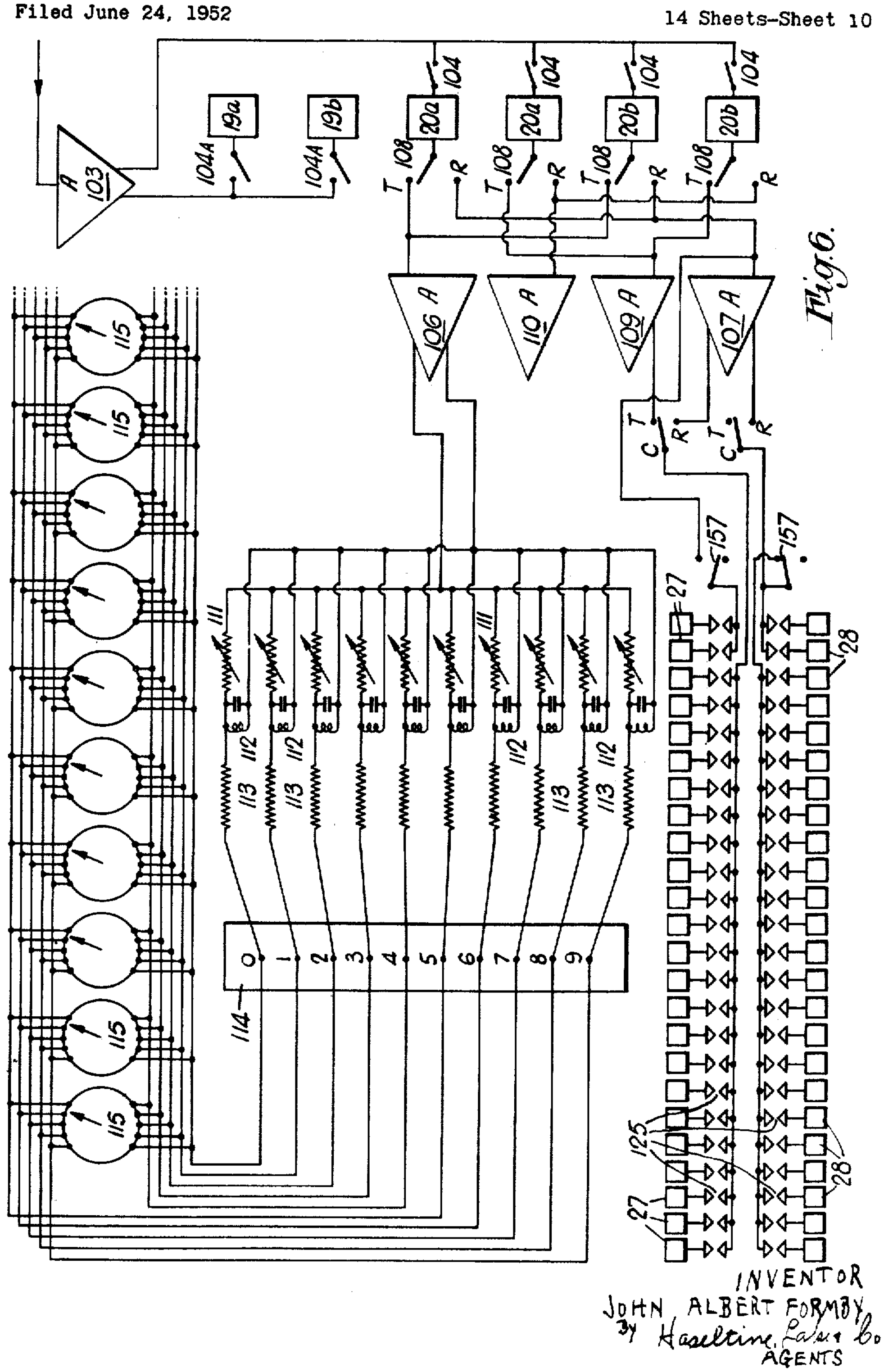

Figure 6 shows the connections between the various amplifiers and magnetic heads, together with the ten frequency sensitive networks associated with the Advanced Transmitting Amplifier, with the associated junction box and ten rotary switches connected in parallel. The ten switches are shown also in Figure 7.

Figure 7 shows in diagrammatic form the ten switches associated with the scanners of Figure 4, the ten rotary switches of Figure 6 and a plugboard in which the output points of Figure 5, the connections to twenty thyratrons of the selectors, twenty four upper micro-limit switches, twenty four lower micro-limit switches, ten channels of a transmit/receive switch, and twenty four solenoids are shown diagrammatically, together with thirteen other plug points associated with the "Receive" mode of operation. Pluggable connections are shown as an example of the normal mode of operation of the apparatus in which all the selectors operate independently and an arbitrary provision is made of "spare" transit drums.

Figure 8:
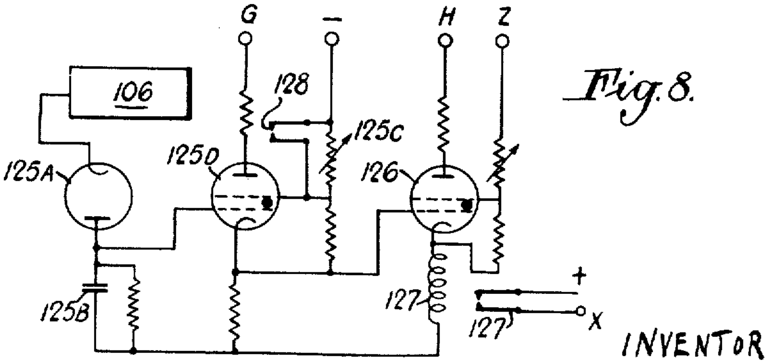

Figure 8 shows the arrangements for providing that gaps which occur on a transmitting drum are produced on the associated transit drums also.

Figure 9:
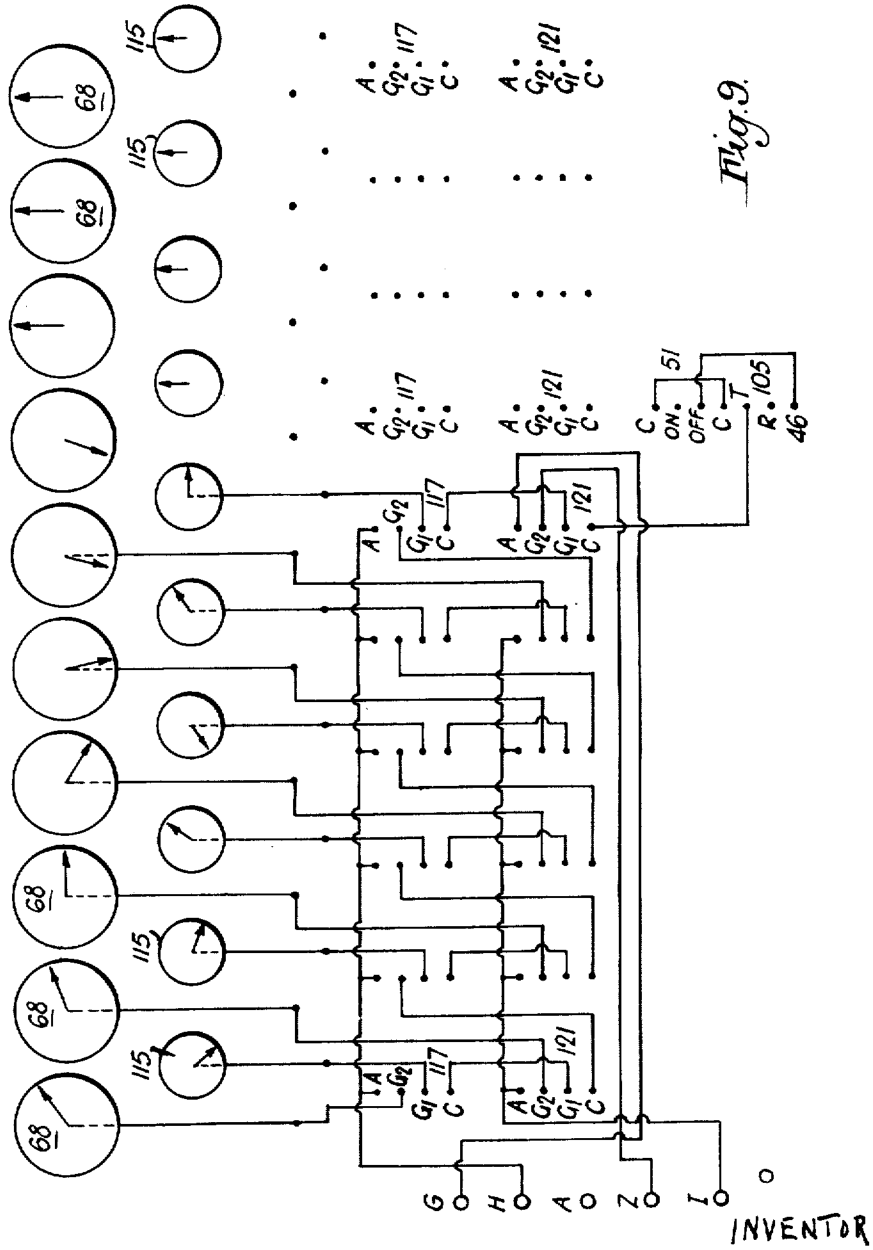

Figure 9 is identical with Figure 7, except that pluggable connections are shown to represent a mode of operation in which six out of the ten selector units operate in conjunction with one another and the remainder are inoperative.

Figure 10:
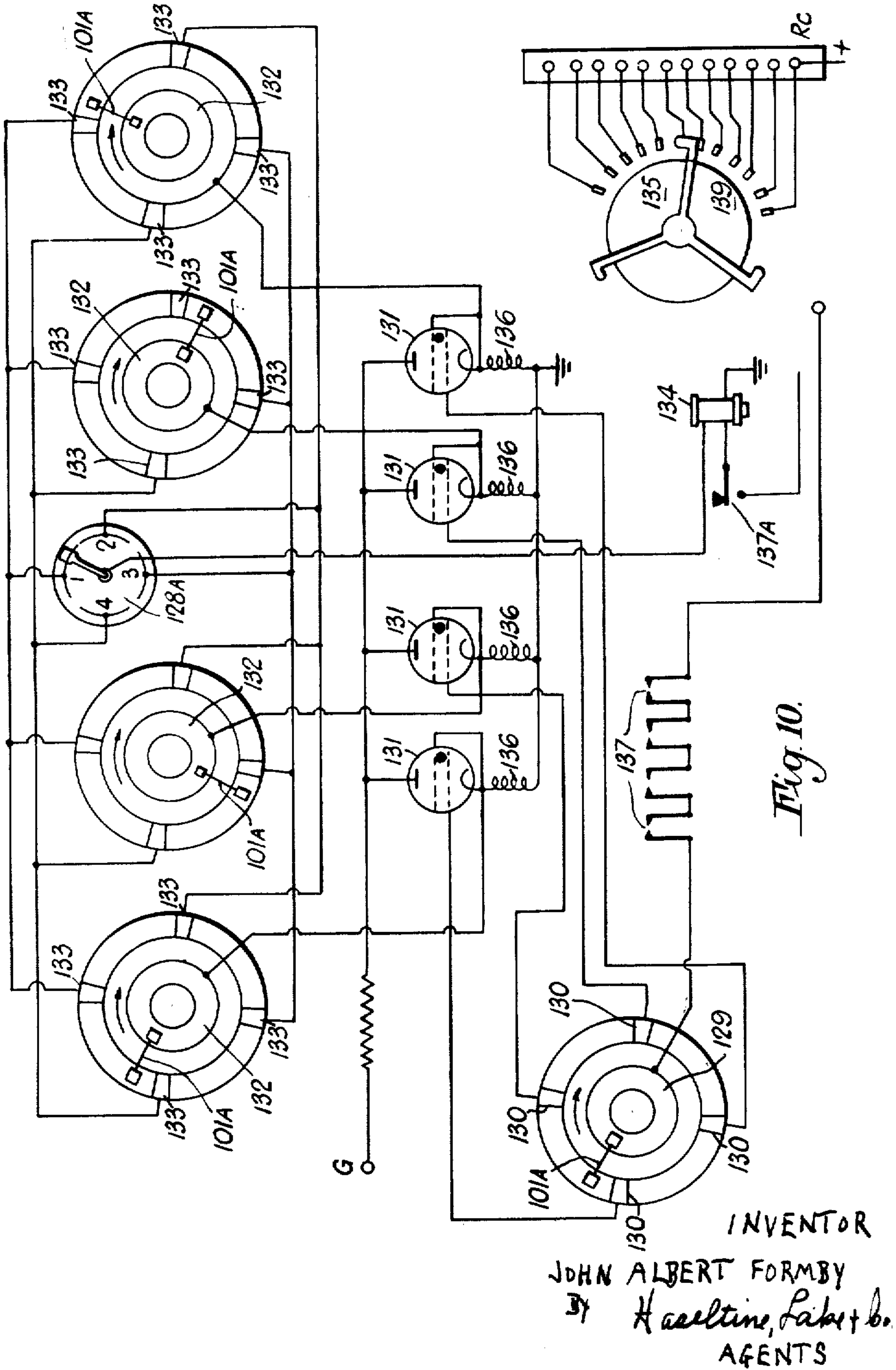

Figure 10 shows the apparatus for creating gaps of one, two or three item lengths following a group of items, together with a representation of the relevant connections to the plug board.

Figure 11:
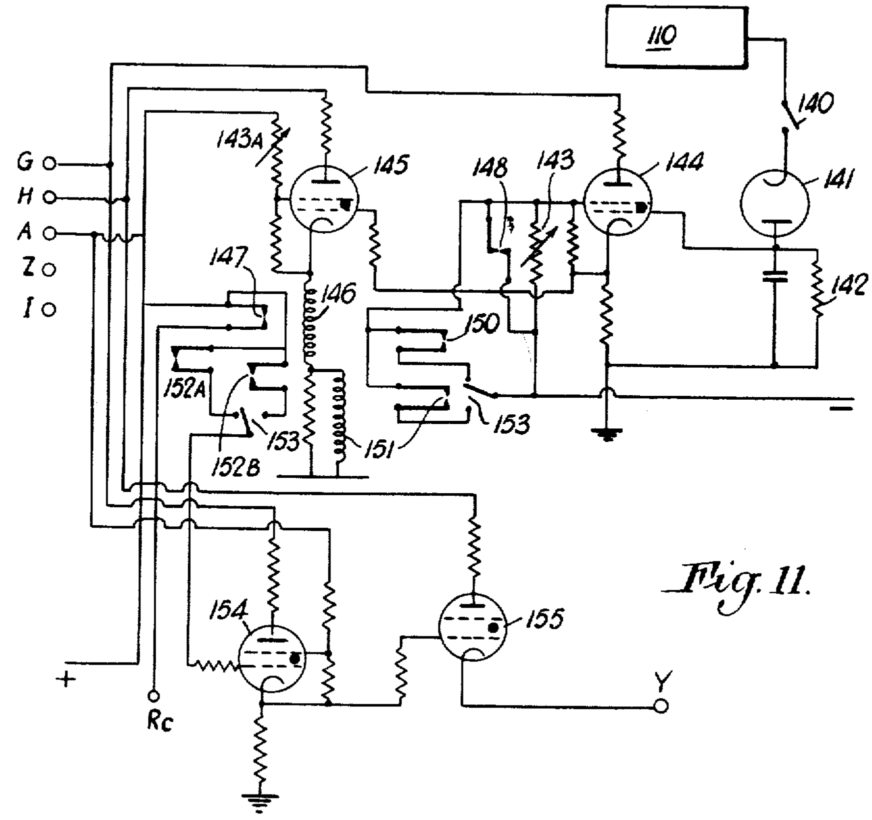

Figure 11 shows the circuits and switches associated with the Advanced Receiving Amplifier which provides means to suppress recording on the receiving drum except in the first gap following a group of recorded items. A means is also shown by which one item of each group may be reproduced on a special transit drum or drums.

Referring firstly to Figure 1D, a transmitting drum 12 bears a sequence of recorded items, each item comprising the same number of symbol positions, say 30, any of which may be occupied by a symbol of value 0–9. These items are presented sequentially to a reproducing magnet **20*b* as the drum rotates. It is desired to reproduce on a transit recorder 1**, those items and only those, which have a prescribed characteristic. In accordance with the principle of the invention in its simplest form, an item is to be reproduced if and only if a prescribed symbol position of the item contains a symbol of prescribed value. Thus, for example, it may be desired to reproduce those items, and only those, for which the tenth symbol position contains a symbol having the value "4" (more briefly, those in which the tenth symbol is a "4").

In order to be able to effect this reproduction, a scanning magnet **20*a* is placed upstream of the magnet 20*b*. In order that any symbol, even the last one, may be preselected, the magnet 20*a* is placed sufficiently far upstream that all the symbols of an item can be scanned by the magnet 20*a* before the first symbol reaches the magnet 20*b*. Thus, it is appropriate to place the magnet 20*a* upstream of the magnet 20*b* by a distance substantially the same as the length of track occupied by an item. The preselection of a symbol position is effected by a position selector 68, which is more particularly described hereafter. This selector may be set to "position ten," for example. The value preselection is made by a value selecting switch 115 which controls a frequency sensitive network forming a value selector 111—113. This value selecting switch may be set to the value "4." In these circumstances an item in which the tenth symbol is a "4" will be reproduced on the transit recorder 1** and no other items will be so reproduced.

The means by which this reproduction is effected includes a first gate 117, which acts as a primer for a main gate 121. This priming gate opens whenever a signal from the value selector coincides in time with a signal from the position selector, the former signal being derived via the value selector from the scanning magnet **20*a*. When this priming gate opens, its effect is to prime the main gate 121. Thus, the main gate is primed if and only if a symbol of predetermined value in a predetermined position passes under the scanning magnet 20*a*** and priming takes place substantially simultaneously with such passage.

However, at the time of priming, the item to be reproduced has not yet reached the main reproducing magnet **20*b*. Accordingly, a timing unit 71, 73, 75, 80, 82, 84, mechanically linked to the drum 12, provides a signal to the main gate at the instant that the item begins to pass under the main magnet 20*b*. This causes the main gate to be opened at that time, provided that it has been primed by the first gate. Thus, the main gate is opened to permit signals corresponding to the whole item to be transmitted via the magnet 20*b* to the recording magnet 27**, while during the time of this transmission, a clutch 30 is actuated so as to connect an intermittent motion mechanism 35, 39 to a screw 24. This causes the item to be recorded on the transit recorder on one turn of a spiral, since the transit recorder itself is in a state of continuous rotation, being mechanically linked to the transmitting drum 12. The intermittent motion, which is described in detail hereafter, is provided for the purpose of enabling the screw 24 to start and stop without any jerk or slip.

Immediately after the timing signal to the main gate, a further timing signal is sent to the first or priming gate 117 to reset it, ready to respond to the next item on the drum 12. At the time when the end of the item on the drum 12 reaches the magnet 20*b*, a further pulse goes from the timing unit to the main gate to close it.

Thus, selected items are recorded each on one turn of a spiral on the transit recorder 1, and the screw 24 moves only when an item is being recorded, with the result that, although items to be selected may appear on the drum 12 separated by items not to be selected, the said selected items are recorded on the transit recorder 1 without gaps corresponding to these unselected items, or, in other words "in compact form."

Moreover it is also possible to sort the information making use of the values of more than one symbol position so that, for example, only items where the first three symbol positions have the respective values 0, 9 and 8 would be transferred to a selected transit recorder. In general the apparatus of this invention is designed to enable information recorded on magnetic tape to be sorted and collated in much the same way as information recorded on punched cards is sorted and correlated.

The invention will now be described in detail, together with an embodiment of apparatus therefor, and thereafter certain modes of operation will be described in detail with reference to block diagrams.

Figure 1E shows a set of twenty four transit drums 1 of Bakelite or similar plastic material covered with magnetic tape material (which is normally manufactured in 12–13 inch widths) having vertical axes and driven through helical gears 2 from two horizontal shafts 3 which are geared by helicals 4 to a third horizontal shaft 5, driven through 2:1 ratio helicals 6 by a vertical shaft 7, which is in turn driven by helicals 8 from a horizontal shaft 9 which is belt driven by an induction motor 10. This motor causes the apparatus to be driven at a constant speed, the total load being substantially constant. The direction of motion may be reversed by reversing the power supply to the motor. The shaft 9 drives a Selsyn generator 11, which may be caused to drive a Selsyn motor in an auxiliary primary recording apparatus, including a magnetic drum on which the primary record is made, so that the apparatus carrying the primary record may be driven synchronously with the apparatus now being described in order to reproduce the primary record on one or other of a pair of Bakelite drums 12 having horizontal axes and driven from the shaft 3 by means of a spur gear 13 engaging an idler wheel 14 which drives a spur wheel 15 fixed to the drum. These drums are provided with screws 16 carrying brass mountings 17, which are also supported by rods 18. Each mounting has a half nut in contact with the screw, so that it may be moved manually from one part of the screw to another. A hardened steel threaded pin 18A carried in the brass mounting engages the thread of the screw, so that rotation of the latter causes the mounting to be moved along the screw. The mounting carries a set of magnetic heads, comprising an erasing head 19 having a track of 0.1 inch and a pair of recording/reproducing heads 20 having tracks 0.055 inch wide. Later on in describing the operation of the apparatus with reference to the diagrams of Figures 1A–1C, one of these heads 20 is identified as a main reproducing or transducing magnet 20*b* and the other is identified as an advanced scanning magnet 20*a*. The screws, having a pitch of 0.1 inch are driven from the drum shafts by sprockets 21 and chains 22, so that each magnetic head follows the same path on the surface of the drum. The two heads 20 are arranged to be at a distance apart exactly equal to an item's length, including the gap between items, measured along the spiral track. The heads are held lightly against the surface of the drums by springs 23. At each end of each drum 12 is a micro-limit switch the details of these and of the mountings 17 are similar to those shown in Figure 2. Each of the drums 12 has a diameter of 11¼ inches and has three channels ¼ inch wide and ⅛ deep parallel to the axis, in each of which the ends of the tape material are held by a brass strip screwed to the Bakelite, the channels being subsequently filled by a suitable material which is afterwards ground to the original surface level and varnished. There is provision for six items, each of thirty symbols in each turn of the spiral, with a gap of two symbol lengths between items. Each of the transit drums has a similar channel in which the ends of the magnetic material are fastened, and each drum has a diameter of 2 inches, there being provision for one item and one gap in each turn of the spiral. The drums are so orientated that the gaps correspond to the "A" and "Z" symbol positions referred to below.

Figure 2 shows the detail of each of the transit drums (1) which is likewise provided with a screw 24 carrying a mounting 25, which is also supported by a rod 26. The mounting is a good fit on the rod and screw. A hardened steel threaded pin 26A carried in the mounting engages the thread of the screw, so that rotation of the latter causes the mounting to move up or down. The mounting, which cannot be moved unless the screw turns, carries heads 27 and 28 held lightly against the surface of the drums 1 by means of springs 29. The head 27 has a track of .005 inch, while the head 28, which is an erasing head, has a track of 0.1 inch and is set slightly higher than the head 27. The reason for this is that, as erasure is only required to take place while the magnetic assembly is moving downwards, it is necessary to ensure, on the one hand that no part of the next lower turn of the spiral is erased before the head 28 can reach it, and, on the other, that due allowance is made for the fact that, as will appear, the spiral track has a variable angle to the horizontal, so that the vertical distance between two points on the track a fixed distance apart will not be constant. It is found satisfactory to set the centre of head 27 a distance of .025 inch higher than the centre of head 28 and at an angular distance of ninety degrees. The screws 24, however, do not rotate at a constant speed, but each is associated with a clutch assembly 30, driven through helical gears 31 from horizontal shafts 32 (see Figure 1E), which themselves are caused to rotate in a variable manner by means of a differential 33 in association with a Geneva stop mechanism constituted by the wheel 34 carrying a dowel pin which engages in the well known form of star wheel 34*a*, and spur wheel pairs 35 and 36. The driving wheel 34 of the Geneva stop is mounted on the shaft 5, as is the larger of the pair 35, the smaller being mounted on the body of the differential which is supported in bearings 37. The star wheel 34*a* is of the type having four symmetrical arcuate bays in its periphery in which engages the circular periphery of the wheel to lock the star wheel excepting when the dowel pin tracks one of the four radial channels in the star wheel, the dowel pin being positioned in a recessed part of the wheel 34 which provides clearance for the star wheel for the quarter revolution applied to the star wheel by the dowel pin. In the drawings the wheel 34 and star wheel 34*a* are shown purely diagrammatically and slightly separated for clarity. The star wheel 34*a* (of the four pointed type) is mounted on one shaft 38 of the differential and the smaller of the pair 36 is mounted on the other shaft 39, meshing with the larger wheel of the pair mounted on the shaft 32A, driving shafts 32 through helical gears 32B. The effect of this arrangement is that when the star wheel is locked, the shaft 32A is driven at a constant speed greater than that of the shaft 5, but as the star wheel starts to turn, the speed of the shaft 32A starts to diminish until the instant when the star wheel attains its greatest speed. This speed is in fact $(\sqrt{2}+1)$ times the speed of the shaft 5. The spur wheel pairs 35, 36 are so chosen that, while the average speed of the shaft 32 is exactly equal to that of the shaft 5, it attains a minimum speed during each revolution, which speed is practically equivalent to a state of instantaneous rest. Various possible gear ratios may be calculated by first expressing $\sqrt{2}$ approximately as one of a series of rational approximations of increasing accuracy, by means of partial fractions. Thus, for example, one approximation is 17/12, leading to the ratios 29:24 and 6:13. However, a convenient and satisfactory pair of ratios are 77:64 and 32:69. With this pair the shafts 32 actually pass through the rest position and rotate in the opposite direction for a very short time during each revolution, so that a period exists during which the speed is negative and not substantially different from zero. The purpose of this arrangement is to ensure that the clutches 30 are engaged and disengaged only at instants when the shafts 32 are substantially at rest.

Each clutch assembly 30 comprises a clutch of the conical friction type as shown in Figure 2, the outer member 40 being driven through the helical gears 31 from a shaft 32. The inner member 40A is screwed into a collar 41 and secured by a grub screw 41A in order to provide an adjustment to the amount of travel. The collar is free to slide on a rod of square cross-section, which forms the upper extension of the screw 24. The inner member may be raised or lowered by the action of a lever 42 mounted on a horizontal pivot 43 and having a forked extremity of conventional type engaging a groove 44 in the said collar. The member is normally maintained in its lowest position by the pressure of a spring 45 enclosing a stalk 45A, which stalk is pivoted to the lever at its lower end and is free to slide in a sleeve at its upper end. The lower end of the spring rests against a metal block supported by the pivot, while the upper end rests against an adjustable screw 46 which may be set in position by means of the lock nut 47. This screw provides an adjustment to the compression of the spring. While in its lowest position, the collar is accurately oriented by means of a bar 48 which engages a slot or groove 49. The inner clutch member is brought into engagement with the outer member by the action of a solenoid 50 which, when energised, pulls the end of the lever downwards by means of the plunger 50A. The outer member 40 is supported in bearings in the plate 50B which forms part of the main framework.

An important feature of the design is that the clutch engages with the minimum of travel after the bar has cleared the groove. No appreciable slipping will normally occur since the motion develops gradually from rest, but if any small amount of slip does occur it may be tolerated, since any error in the orientation of the member and consequently of the screw 24 is corrected when the bar 48 returns to the groove 49, on disengagement of the clutch. The bar and groove are provided with bevelled sides in order that any such error of position may be corrected and prevented from accumulating. It is necessary that the clutch action should be light and the amount of movement small in order to provide for rapid action.

Each of the screws 24 is provided with an upper micro-limit switch 51 and a lower micro-limit switch 52, both of the Burgess CR type having a very small differential movement. Each micro switch is operated by the magnetic head assembly mounting 25 when approaching the end of its travel pressing against a pivoted quadrant 53 which transmits the pressure to a screw cap 54, which is adjustable on the fine threaded end of a bar 55 pivoted by a horizontal pivot 56 to a second bar 57 having a similar threaded end carrying an adjustable screw cap 58 which engages the micro switch button 58A. The two bars lie in a horizontal groove with the pivot lying just below the line of thrust, so that the bars normally lie in a straight line. A vertical screw 59 has its upper end in a V-shaped groove of the bar 57 so that the latter is capable of an extremely small horizontal movement without touching the screw. The screw cap 54 may be so adjusted that the mounting 25 brings pressure to bear at a precise point in order that the associated solenoid may come into action just in time for the clutch to operate correctly. The screw 58 may likewise be adjusted to ensure that the micro switch operates at a precise point. In the event, through a fault, of the clutch failing to operate, the mounting 25 will continue to advance. This causes the pin 59 to press against the bar 57 causing the pivot 56 to rise above the line of thrusts and so relieve the pressure and prevent damage. The rising bar 57 closes a contact 60 which may be caused to switch on a warning light.

The screws 16 are likewise provided with a micro switch 16A at each end (see Figure 1), which is operated in a similar manner by the mounting 17. The function of these switches is to cut off the recording amplifier after the end of one item and before the beginning of the next. These micro switches also operate relays (not shown) cutting off the power supply to the main motor. Figure 3 shows the detail associated with a vertical shaft 61 driven by helical gears from the shaft 5 carrying a set of ten aluminum discs 62 comprising the chief body elements of a cyclical timing unit. Mounted on each of these, which are insulated from the shaft by means of a plastic bush, is a pair of carbon brushes 63, one brush moving over a continuous brass ring 64 and the other moving over a set of thirty-two independent sectors 65, separated by narrow gaps from the parts of a brass piece 66, each set being mounted on a Bakelite plate 67 (about 5 inches square). The thirty-two sectors correspond to the thirty symbol positions within the item together with a gap equivalent to two symbols between consecutive items. It is convenient to denote the sectors by A, 1, 2, 3, 4, . . . 29, 30, Z. The sectors 1, 2, 3, . . . 30 are wired to the terminals of ten manual thirty position switches 68 so that one of the sectors may be selected in each case by setting the switch to the appropriate position. Thus the switch 68 sets the cyclical timing unit 62—66 to apply a signal at a time corresponding to a particular symbol position as will be more clearly explained hereinafter. Figure 4 shows in detail a single scanning unit and its associated switch. Each of these is connected to a point of negative potential separately through its distinctive resistance 69, and each ring 64 is connected to a point of positive potential through an adjustable resistance 70. Thus, the centre of each switch 68 will be at a negative potential except when the sector to which it is connected is in contact with a brush, during which time it will have a value intermediate between that of the positive and negative sources, and will be adjustable by means of the resistance 70. The selected switch position, as will appear below, corresponds to the symbol position within the item which it is desired to select. Accordingly the outputs of the ten switches 68 may be applied to selective devices as will appear.

Figure 3 and Figure 5 show also two pairs of brushes 71 and 72 similarly mounted on discs 71*a*, 72 respectively, one moving on a continuous brass ring (73 and 74 respectively) and the other moving on a ring (75 and 76 respectively) having a gap in which a single sector lies, the entire gap being only slightly wider than the brush. The rings 75 and 76 provide outputs which are broken for a brief interval once during each revolution. These breaks are timed to occur immediately after the end of symbol 30 and immediately before the beginning of interval 1 respectively. The rings are mounted on Bakelite plates 77.

Figures 3 and 5 show a further pair of brushes 78 similarly mounted on a disc 78A, one moving over a continuous brass ring 79 and the other over a set of thirty-two independent sectors 80 separated by narrow gaps from the parts of a brass piece 81, all being mounted on a Bakelite plate 82. The sectors A (83) and Z (84) provide two independent outputs and the sectors 1–30 are connected together to provide a third output (85) capable of supplying an intermittent voltage.

Figures 1E, 3 and 5 show also, carried on the shaft 61, a spur wheel 86 engaging a spur wheel 87 having a ratio of 1:4 and carrying a shaft 88 on which is mounted a spur wheel 90 having a 1:3 ratio. The shaft 91 which, accordingly, has one twelfth of the speed of the shaft 61, carries a set of discs 92 on each of which is mounted a pair of brushes 93, one moving over a continuous brass ring (94*a*, *b*, *c*, *d*, *e*, *f*) and the other moving over a ring (95*a*, *b*, *c*, *d*, *e*, *f*) broken into twelve sectors by small gaps symmetrically placed.

Ring 94*a* has all its sectors except the fourth, eighth and twelfth connected direct to the ring 73 and the remainder to the ring 75 (see Figure 5). Thus, the output of the ring 94*a* is broken once in every fourth item at a time coinciding exactly with the break in the output of the ring 75. The ring 95*b* has all its sectors except the third, sixth, ninth and twelfth connected to ring 73 and the remainder to ring 75. Thus, the output of ring 94*b* is broken every third item. The ring 95*c* has all sectors except the second, fourth, sixth, eighth, tenth and twelfth connected direct to ring 73 and the rest to ring 75. Thus, the output of ring 94*c* is broken every alternate item. The rings 75 94*a*, 94*b*, 94*c* are connected to the four quadrants of a four position switch 96*a*. Thus, according to the setting of this switch, its output is broken every item or every second, third or fourth item, the timing and duration of the break being independent of the switch setting.

Similarly a switch 96*b* has an output broken at a time corresponding to the output of sector 76.

A further set of discs 97 (see Figure 3) carry brushes 98, one moving over a continuous ring (99*a*, *b*, *c*, *d*, *e*, *f*) and the other moving over a ring (100*a*, *b*, *d*, *d*, *e*, *f*) broken into twelve sectors by small gaps symmetrically placed. The brushes are so orientated that a brush always lies wholly on one sector during the time that a brush is in contact with the sector 83. The fourth, eighth and twelfth sectors of the ring 100 are connected to sector 83. The output of ring 99*a*, therefore, provides a signal once in every four items at a time corresponding to the output of 83 i.e. during the interval "A". Similarly the ring 99*b* has an output once every three items and the ring 99*c* has an output once every alternate item. The sectors 83, 99*a*, 99*b*, 99*c* are connected to the four quadrants of a switch 96*c*. Thus, according to the setting, this switch has an output which occurs once during every item or every second, third or fourth item corresponding to the interval "A."

Similarly a switch 96*d* has an output corresponding to the interval "Z."

The switches 96*a*, 96*b*, 96*c*, 96*d* are ganged so as to form a single switch 96 having four distinct channels. The outputs are brought to points G, H, A, Z of a plugboard.

The Bakelite plates associated with the discs 92 and 97 are mounted on a common set of four steel rods in the manner described above.

The shaft 88 carries five discs 101 on each of which is mounted a pair of brushes 101A associated with brass rings mounted on Bakelite plates 102, the function of which will be described later. The plates 102 are mounted on a common set of rods 102A as are the plates 67, 77, 82 and the plates 102 in order to provide a rigid structure.

In order to understand the functioning of the apparatus, it should be appreciated that all the moving parts, except those driven from the differential, move at constant speeds which have a definite relationship to the matter to be recorded or reproduced. Thus, the shaft 61 makes one complete rotation in the same time as a transit drum and in the time which a magnetic head moves over the surface of a drum 12 a distance equal to that from the beginning of one item to the beginning of the next, this distance being exactly equal to the distance apart of the two magnetic heads 20 measured along the spiral track.

Figure 6 shows the connections between the various amplifiers and magnetic heads.

Recorded matter may be introduced to the apparatus by connecting any one of the heads 20 (see Figure 1E) to the recording amplifier 103 (see Figure 6), by means of a switch 104, the input of the amplifier being derived from a primary recording apparatus or other apparatus, which may be at a remote point, on which a suitable form of record already exists (the signals being conveyed by a wire connection), and which may be driven synchronously with the main apparatus by means of the Selsyn generator 11 (see Figure 1E). This recorded matter may be transmitted to the apparatus in reverse order and during recording the erasing head 19 may be employed to erase any existing record on the drum 12, the head being controlled by a switch 104A (see Figure 6). It may also be arranged that the recording medium of the remote apparatus is so orientated that the recording of the first symbol of an item to be received occurs when the carbon brushes reach sector 30 of the sectors 65 (see Figure 4). The amplifier 103 is preferably provided with a band pass filter in order to reject signals lying outside the range of the ten primary frequencies, which is approximately an octave. A magic eye visual indicator not shown is preferably associated with this and other amplifiers to be described, in order to indicate when signals are actually passing through the amplifier. Direct current biassing is used in all cases. The same amplifier may be used to transmit matter recorded on the drum 12 to a suitable magnetic recording medium at a remote point synchronously driven by the Selsyn generator 11.

It will be convenient to distinguish the two drums 12 as 12*a* and 12*b*. Assuming that a recording has been made on drum 12*a* in the manner described, the following four modes of operation of the apparatus may be distinguished:

(*a*) Transmission from drum 12*a* to transit drums,
(*b*) Reception from transit drums to drum 12*b*.
(*c*) Transmission from drum 12*b* to transit drums,
(*d*) Reception from transit drums to drum 12*a*.

A switch 105 (see Figure 7) is used to distinguish between the transmitting and receiving modes of operation. It should be noted that the main motor and, consequently, all the moving parts, turn in one direction for transmission and in the opposite direction for reception and for receiving the primary record in the manner described above.

While operating in the transmitting mode, one, 20*a*, of the two recording/reproducing heads associated with the drum 12*a* (assuming this is to be the transmitting drum) is connected to the advanced transmitting amplifier 106 (see Figure 6) or to the main receiving amplifier 107 by means of a two position switch 108, while the other head 20*b* is similarly connected either to the main transmitting amplifier 109 or to the advanced receiving amplifier 110.

The output of the advanced transmitting amplifier 106 is applied to a set of ten frequency sensitive networks, each consisting of an adjustable resistance 111 and a parallel circuit 112, the inductance of which is provided by a miniature coil with an iron dust core. Each of these circuits is independently tuned to a distinct frequency, that being the frequency of one of the ten basic symbol values as it is reproduced from the drum 12. The values of these basic frequencies will depend on the method of making the primary record of the matter which is hereinafter described and upon the speed at which the apparatus is driven. Preferably the main motor has a speed of 1440 r.p.m. and the transit drums rotate at 180 r.p.m. and the drums 12 at 30 r.p.m. The ten basic frequencies preferably range from 9000 to 18,000 cycles per second approximately and the amplifiers are designed to give a flat response over this range and to discriminate against lower frequencies in order to improve the signal to noise ratio. The principal reason for employing such comparatively high frequencies, is the desirability of modulating them with lower frequencies in such a manner that there is a sufficiently large number of amplitude undulations within a symbol's length to distinguish one mode of modulation from another. This is obviously necessary if symbols are subsequently to be translated into printed form by any known means.

Figure 6 shows the junction of the resistance 111 and the circuit 112 is in each case connected by a resistance 113 to a ten point junction box 114 which is connected to ten manual switches 115 in parallel. Figure 7 shows these ten switches connected to the control grids of thyratron tetrode valves 117 (see Figure 7). These valves are of the Mullard 2D21 type. The shield grid is connected in each case to the rotor of one of the switches 68. Thus, by setting the two switches associated with each thyratron, a particular symbol position and a particular symbol value are selected in each case. By means of the adjustable resistances 70 (Figure 4) and 111 (Figure 6) it is arranged that both these grids are held sufficiently negative to prevent striking except during a period corresponding to the selected symbol position, in which a symbol value corresponding to the selected tuned circuit occurs. Thus, any one of these valves will strike if, and only if a symbol in the prescribed symbol position as indicated by the setting of switch 68 has the prescribed symbol value as indicated by the setting of switch 115. The anodes have loads 118 through which the anodes are connected to the point H (Figures 5 and 7) which is normally connected to the first position of switch **96*b* so that the anode supply is cut off once per item. Therefore, if one of these thyratrons strikes, it will remain conducting until just before symbol 1 of the next item is reached. The cathode of each thyratron has a load resistance 119 (Figure 7) and is itself connected through a resistance 120 to the control grid of a second thyratron 121. The shield grids of thyratrons 121 are connected to the "Z" output 96*d* through an adjustable resistance 122 and to a point of negative potential through a resistance 123. By this means the shield grids are held at a sufficiently negative potential to prevent striking except in the interval "Z" corresponding to the first half of the gap between consecutive items. The anodes of thyratrons 121 are supplied through resistances 124 from the point G so that the supply is broken immediately after the last symbol of each item (assuming that the switch 96*a* (see Figure 5) is in its first position) and is restored during the period "Z." Thus, any thyratron 121 is able to strike only during the interval "Z" and can do so only if the corresponding thyratron 117 is conducting. Once struck it will remain conducting until the anode supply is interrupted after the last symbol of the next item, or of the second, third or fourth item according to the setting of the four ganged switches 96*a*, 96*b*, 96*c* and 96*d*** (see Figure 5).

The cathode of any one of these thyratrons may be connected to the transmit side of a channel of the transmit/receive switch 105 and via the centre point of said switch to the centre point of an upper micro-limit switch **51*a*, the off side of the latter being connected to a solenoid 50A, which may be any one of the twenty-four solenoids 50. (An example of this is shown in Figure 7.) The energisation of this solenoid causes the corresponding clutch 30 to engage and also operates a pair of contacts 125 (Figure 6) by one of which the output of the main transmitting amplifier is connected, via the switch 105 to the recording head 27 with which the selected solenoid is associated. The interruption of the anode supply to the thyratrons 121**, while long enough to cause deionisation, is sufficiently short that where consecutive items are selected, the clutch is not substantially affected in the interval between them.

The on side of an upper micro switch 51A (see Figure 2) of a selected transit drum may be connected to a spare solenoid 50B associated with a spare transit drum, through the upper limit switch 51B and the corresponding lower micro switch 52B, as shown in Figure 7. If desired, the on side of 51B may likewise be connected through an upper micro switch 51C and lower micro switch 52C to a further spare solenoid 50C so that its associated transit drum may provide additional spare capacity. Thus, when the first transit drum becomes filled with recorded matter, the upper limit switch 51A will be operated, thus disconnecting the solenoid 50A and connecting 50B instead. Similarly when the spare transit drum becomes filled, the upper limit switch 51B will be operated, so disconnecting the solenoid 50B and connecting 50C instead. These connections being made by pluggable connectors, the transit drums may be utilised in any desired manner according to the nature of the material to be sorted.

Thus, each of the thyratrons 121 (see Figure 7) may be regarded as a gate valve which admits only the required items to the transit drum with which it is associated, and, through the action of the clutch, provides that such items are recorded in compact form on the transit drum. After each item has been so selected, through the action of one of the thyratrons 121, the thyratrons 117 and 121 are restored to a condition in which a further item may be selected. Thus, the selective process may be continued until all the recorded items have been duly transmitted to one or other of the transit drums.

Figure 8 shows the apparatus necessary in order to provide that gaps on the transmitting drum following an item occur also on all the ten transit drums which are associated with selectors. The advanced transmitting amplifier output is applied to a diode 125A with its associated load circuit 125B. The output of the diode is applied to the control grid of a thyratron 125D, the striking point of which is adjustable by means of the resistance 125C.

The thyratron 125 is connected to a second thyratron 126 in a similar manner to that in which thyratron 117 is connected to 121, the anode supplies being similarly provided, i.e. anode of 125D to G, and anode of 126 to H. Since null symbols are represented by a definite signal, it is evident that, by adjusting the resistance 125C, the thyratron 125D may be prevented from striking as long as a signal is being received at the advanced reproducing head, but will strike when a gap, not present when the primary record was made, comes under the advanced reproducing head, thus causing the thyratron 126 to conduct for the whole of the period during which the gap is under the main reproducing head. The thyratron 126 when conducting, energises a relay 127, by means of which a potential is applied to the grids of all ten thyratrons 117 via points X causing them all to conduct so that a gap is formed on each of the transmit drums, since the main amplifier, though connected to the drums, will cause no record to be made since no signal is present.

It is necessary to ensure that the diode 125A does not start to operate in the manner described until some recorded matter has passed under the advanced reproducing head, otherwise a blank portion of the track would be treated as a series of spaces. This requirement is met by a contact 128 which is normally closed but is opened by a relay which is tripped when the first item is transmitted. The contact when closed causes the shield grid of thyratron 125D to be at a negative potential, but when open, the shield grid potential rises, as indicated in the drawing. Accordingly thyratron 125D cannot strike until the contact is opened.

The mode of operation described above of the pairs of thyratrons 117 and 121 (see Figure 7) is that in which all the pairs operate independently, and in which it is normally to be expected that there will be a different setting of the switch 115 for each thyratron 117 but a common setting of the switch 68. Figure 9 illustrates an arrangement of the plug board connections such that the apparatus may be set to select those items only for which a set (say six) of symbol positions contain symbols of prescribed values. Six switches 115 are set to the respective values which it is desired to select and six switches 68 are set to the respective symbol positions. The output of the first switch 115 is applied to the control grid of the first thyratron 117 and the output of the first switch 68 to the shield grid. The cathode is connected to the control grid of the corresponding thyratron 121 as before, but the output of the next switch 68 is applied to the shield grid of 121. The anode supply is also varied so that it is now derived from the sector output 85 via the point I (Figure 5) and, consequently is perpetually interrupted. The cathode of this valve is connected to the shield grid of the next thyratron 117 and the output of the next switch 115 is applied to the control grid, the anode supply being unaltered. Thus, the second valve 117 will strike if the first one has struck and if the required symbol value has been applied to the thyratron 121 at a time when it was conducting. Thus, the striking is subject to four conditions. By a continuation of this process, the sixth thyratron 117 will strike if twelve conditions are satisfied. The cathode of this valve is connected to the control grid of the sixth thyratron 121, the shield grid being connected by a pluggable connector to output 96*d*. The cathode of this last valve is similarly connected to a solenoid 50, thus causing the selected items to be recorded in compact form on the associated transit drum.

The process of transmitting from a drum 12 to transit drums may be ended by operating a manual switch when a magic eye indicator associated with the transmitting amplifier shows that there is no more matter to be transmitted, or it may be ended automatically by the action of two limit switches, one cutting off the amplifier and the other cutting off the power supply to the main motor.

The transmit/receive switch may then be turned to "receive" and the main motor switched on again in the opposite direction. During the process of transmission described above, each head 27 has moved upwards a distance equal to the pitch of the screw 24 each time an item has been recorded on it, so that at the conclusion of transmission each head is left at a height above its starting point depending on the number of items it has recorded (which is in general fortuitous). In the process now to be described each transit drum operates successively, the head 27 moving downwards until the lowest position is reached when the lower micro switch 52 is operated. During this process the head 27 acts as a reproducing head and the head 28 as an erasing head in order to leave the drum clear for further recording. As each switch 52 is operated the corresponding solenoid 50 is disconnected. It is necessary to provide for the required number of item gaps on the receiving drum by allowing a suitable interval of time to elapse before the next transit drum comes into operation.

Figure 10 shows the means for the selection of the required number of gaps by the operation of the switch 128A associated with the brushes 101 and brass rings mounted on Bakelite plates 102 already referred to. One of a pair of brushes 101 moves over a continuous brass ring 129 and the other moves over a set of eight brass sectors, four of which, 130 are symmetrically placed 90 degrees apart, each being connected to the control grid of one of four thyratrons 131, the anodes of which are supplied from the point G. The cathode of each of these thyratrons is connected to one of four continuous brass rings 132, on each of which one of a pair of brushes moves, while the other moves over a set of eight brass sectors, four of which, 133 are connected to the switch 128A. All five of the pairs of brushes 101 are mounted on discs, which are mounted on the shaft 88 (but insulated from it) which rotates in a period equivalent to four items duration. The effect of operating a lower mirco switch 54A is not only to break the connection to a solenoid, but also to supply current to the ring 129 via the point 138 which is connected to the on sides (Figures 7 and 10). It will be appreciated that the instant when this occurs will be within an interval "A" following the last symbol of an item (in reverse order). This will be an instant when the second brush of the pair lies on one of the sectors 130, but the particular one of the four will not be determinable, since it will depend on the number of items which have been recorded on the drum, which is, in general fortuitous. The particular one of the sectors 130 which is thus connected to the micro switch will cause the thyratron to which it is connected to strike, so supplying current to the corresponding continuous ring 132 and hence, through the brushes to the eight sectors successively, four of which 133 are connected to separate quadrants of the four position switch 128A. The brushes are so oriented with respect to the sectors that a brush always lies on one of the sectors 133 when the thyratron strikes. This sector is connected to the first quadrant of the switch and the others are connected successively. Thus, the switch may be set so that when the thyratron strikes the stepping solenoid 134 receives a signal either instantly, or after one, two or three item intervals according to the setting of switch 128A. The signal so received is applied to the operating coil of a ten position minor switch of the Siemens type 134 causing the rotor 135 to move forward one step. It is evident that if the sixteen sectors 133 are suitably connected to the four quadrants of the switch 128A the signal received at the rotor will be delayed by a time which is independent of the particular one of the thyratrons which supplies the current. Any thyratron which conducts is cut off again by the interruption of its anode current supply after the brushes have made one rotation. Each of the thyratrons 131 when conducting emergises a relay 136 which opens a contact 137, so cutting off the current supply from the on side of the lower micro switch 51 to the ring 129 via the point 138.

The common contacts RC of the minor switch 135 are supplied with an electrical potential by means of which, via the lower micro switch 52A, transmit/receive switch 105, the upper micro switch 51A the solenoid of each transmit drum is successively energised. Thus, as soon as the rotor of the minor switch moves a step forward, potential is no longer suplied to the micro switch 51A to which the minor switch was connected, so it is no longer necessary for the contact 137 to be open, and as the thyratron ceases to conduct, the contact is closed again. A new micro switch 51A off side is now supplied with potential, the effect of which is to energise the associated solenoid 50A, so operating the corresponding clutch 30 and the pair of contacts 125 (Figure 6), the first of which connects the head 27 to the main receiving amplifier 107, and the second contact connects the erasing head 28 likewise. Finally the rotor steps to the zero position, from which it may be stepped forward by pressing a key 137A (Figure 10).

It will be appreciated that during reception the items from a transit drum are received in reverse order from that in which they were recorded. Thus, the first of the minor switch contacts 139 is connected to the tenth solenoid, the second to the ninth, and so on (see Figure 7). Thus, where a transit drum has been connected to a spare drum for the purpose of providing for excess items, the latter from the spare drum will always be received before the former items. Thus, the magnetic head of the spare drum will move downwards until the lower micro switch 52B is operated. At this stage there must be no gap in the received record. Consequently the on side of the switch 52B is connected to the off side of the upper micro switch 51B with which it is already associated via the on side of the latter. Thus, when the switch 52B is operated it energises the solenoid 50A of the transit drum with which the spare drum is associated, so that the delaying apparatus does not function in this case and reception proceeds without a gap. Similarly the on side of 52C will be connected to the off side of the corresponding switch 51B.

Figure 11 illustrates the operation of the advanced receiving amplifier 110 which is provided for the purpose of suppressing transmission to the receiving drum when there is already a record present and is brought into action by means of a manual switch 140. The output of the amplifier is applied to a diode 141 and associated circuit 142. An adjustable resistance 143, similar to 124 already described, controls the striking point of a thyratron 144, to the control grid of which the diode output is applied. With the thyratron 144 is associated a second thyratron 145, the operations of which are similar to those already described in connection with the pair 125D and 126, but the anode supplies are derived from points G and H respectively, and the shield grid of the latter is connected via a variable resistance 143A to A instead of to Z. The resistance 143 is adjusted so that the thyratron 144 cannot strike while there is an item recorded under the advanced receiving head, but when there is a gap the thyratron strikes, so causing the thyratron 145 to conduct during the whole of the time that the gap is passing under the main receiving head. This thyratron in striking energises an operating coil 146 of a relay thus closing a contact 147 in the supply line to the common contacts of the minor switch RC (see Fig. 10), thus providing current to a solenoid 50 only during the second or second and third gaps thus engaging the clutch of the operative transmit drum and closing the contacts 125, so permitting reception to occur.

It is necessary to ensure that the diode 141 does not become effective in the manner described until some recorded matter has passed under the advanced receiving head, otherwise a blank portion of the track would be treated as a series of spaces. This requirement is met by a contact 148 which is normally closed and is opened by a relay which is tripped when the first recorded item is received, so that when the contact is closed the shield grid of thyratron 144 is held at a large negative potential, but when the contact is opened, the shield grid is brought to a higher potential as indicated in Figure 11.

Groups if items on the receiving drum may be separated by more than one gap and it may be desired that further matter be recorded in the first of such gaps but not in subsequent ones. There is a second contact 150 which is closed by the operating coil 146, by means of which a heavy biassing potential may be supplied to the shield grid of thyratron 144. Thus, if groups of items on the receiving drum are separated by two or three spaces, the first space will cause the thyratron 144 to strike, thus causing the thyratron 145 to strike also, thus permitting recording to take place. However, during the passage of the second space under the advanced receiving head, the thyratron 144 is unable to strike because of the bias on its shield grid, while, of course it has already been cut off after its previous conduction by the interruption of its anode supply. Thus, recording is supressed in the second space. Suppression of recording in the third space may be achieved by causing the thyratron 145 to operate a second relay 151, which may be caused to supply bias to the shield grid of thyratron 144 in lieu of the contact 150 by means of the switch 153. But the relay 151 is slugged so that the break is delayed by an interval greater than one item's duration and less than two. Thus, the bias remains operative to prevent the thyratron from striking during the passage of the third space under the advanced recording head, but not long enough to interfere with its action in respect of the first space following the next group if it should happen that the next group consists of a single item only.

Thus, if for example, the receiving drum contains groups of items in account number order and it is desired to record the opening balance of each group in the space immediately preceding the group, this can readily be done, from a set of opening balances recorded on a spare transit drum. As recording takes place in the reverse order from the true sense, the opening balance of highest account number will be recorded in the first space following the last group of items on the receiving drum, then the transit drum clutch will disengage and transmission will cease until the first space following the next group is reached, when the opening balance of the next highest account number will be recorded therein. This process may continue until the opening balance of the lowest account number is recorded in a space immediately following the ultimate group on the receiving drum (i.e. the first group in numerical order, since recording has been made in reverse order).

A further provision is made that when reception is taking place from transit drums, the first item to be received from each group, i.e. the first item to succeed a set of spaces, may be received also on a spare transit drum, the items so received being recorded in compact form thereon. This is shown also in Figure 11. Each of the operating coils 146 and 151 has an additional contact (152A, 152B) one of which is closed when the relay is energised according to the setting of the aforesaid switch 153. This causes current to be supplied from a positive supply point during the second or second and third space following a group to the control grid of a thyratron 154 by means of which a second thyratron 155 may be caused to strike in the manner already described, the anodes being supplied from points G and H respectively and the shield grid of the latter from A. This thyratron may be connected to a solenoid **50*d* of a transit drum set aside for the purpose. Thus, the first item following a sequence of two or three spaces is recorded on that transit drum, the items so recorded being either in compact form or alternating with a gap according to the position of switch 153. For the purpose of this operation the magnetic head assembly of this special transit drum must first be brought to the uppermost position. This may be done by applying an energising current to the solenoid 50*d* by means of a manual switch 156 during transmission, the supply being taken through the corresponding upper micro switch, so that the screw is brought to rest when the upper position is reached. Thus, while recording is taking place on this transit drum (during reception on drum 12) the head assembly moves downwards. The corresponding contacts 125 must in this case be separately connected in parallel with the main recording head. This is done by providing one or more pairs of contacts with a separate manual switch 157**, which also disconnects the erasing heads.

It will be apparent from the foregoing that where the symbols of an item are less in number than the standard number they may be made up to standard by "null" symbols or gaps.

This arrangement has a special purpose in relation to the invention disclosed in the provisional specification of my British patent application No. 27,314 of 1951 whereby the selective devices, operating in conjunction with each other according to the second mode of operation described above, may be continually reset, so that after the opening balance of an account number has been selected from a complete set of account numbers (both moved and unmoved), corresponding to the first item recorded on the transit drum, the devices may be reset in order to select the opening balance relating to a second account number related to the second item recorded on the special transit drum. Thus, the opening balances relating to all the items recorded on that drum will be successively selected from the totality of opening balances, each being subsequently recorded in its appropriate space in association with a group of items on the receiving drum.

A block diagram has been provided in three parts, namely Figures 1A, 1B and 1C. The block diagram of Figure 1A shows a normal transmitting mode. The block diagram of Figure 1B shows the special transmitting mode of operation and the block of Figure 1C shows the receiving mode of operation.

Referring to the block diagrams of Figures 1A and 1B items recorded on the transmitting drum 12 are reproduced by the main reproducing magnet **20*b* and electrical signals transmitted therefrom via the switch 108, main transmitting 109 amplifier, switch 108*a* and contacts 125 to the recording magnet 27 of a transit recorder 1. Recording takes place only when the contacts 125 are closed. These contacts are controlled by a relay operating coil 50 which also controls the clutch 30 so that the screw 24 drives only when recording takes place. The relay coil 50 is controlled by the advanced scanning magnet 20*a* which scans the data recorded on the drum 12 before it reaches the main reproducing magnet. Signals from the magnet 20*a* are transmitted via the switch 108, advanced transmitting amplifier 106 to a set of frequency sensitive networks 111—113 which is connected to a junction box 114 controllable by a manual switch which may be set to apply via the frequency sensitive network signals corresponding to a particular symbol value to the first gate 117. A cyclical timing unit 62/66 may be set by the switch 68 to apply a signal at a time corresponding to a particular symbol position likewise in the gate 117. Thus the gate 117 opens if and only if a symbol of the prescribed value is determined by the switch 115 occurs in the symbol position determined by the setting of the manual switch 68. Thus the first gate opens or not according as this condition is satisfied and if it opens does so at the time when the predetermined symbol position passes under the advanced scanning magnet. It remains open until the whole of the item has passed under the advanced scanning magnet, and in particular, until after a signal has been emitted by the timing unit 71, 73, 75 corresponding to the beginning of the passage of an item under the main reproducing magnet. If the first gate is open, then the second gate is caused to open at the time when the item starts to pass under the main reproducing magnet and the second gate remains open until it is closed by a signal from the unit 80, 82, 84 corresponding substantially to the end of the passage of the item under the main reproducing magnet. The relay coil 50** aforesaid is energised while the second gate is open and not otherwise. Thus, the realy coil is energised if an item having a prescribed symbol value in a prescribed symbol position passes under the advanced reproducing magnet and the period of the said energisation corresponds to the passage of the item under the main reproducing magnet.

The delay units controlled by the manual delay control 96 may be adjusted to delay the closing of the gates 117 and 121 for periods corresponding to 1, 2 or 3 item's duration, so that the relay 50, when energised, remains so during the passage of 2, 3, or 4 items under the main reproducing magnet instead of one only.

The block diagram of Figure 1C shows the arrangements for the receiving mode designed to provide that a prescribed number of gaps may be provided on the receiving drum during reception from the transit drums. Thus data recorded on a transit drum is received by the receiving drum to which it is connected subject to the contact 125 being closed and the clutch 30 operative. Thus reception occurs if and only if the corresponding relay coil 50 is energised.

A minor switch, having a constant signal input has ten outputs connected each to a solenoid 50 via a lower micro-limit switch 52 and an upper micro-limit switch 51. The on side of each lower main limit switch is connected to a gap determining unit 131/136 which is controlled by a manual switch 128A to determine a number of item length gaps between the end of reception from one transit drum and the one set of reception from the next. Thus when the whole of the data from any transit drum has been received, the lower main switch passes to the "on" position, so applying a signal to the gap determining unit, and thus the main switch operating coil is energised after a delay of duration depending on the setting of the manual switch. During this time, of course, the receiving drum continues in motion so that a gap of appropriate lengths is created before the main switch rotor steps to its next position, so disconnecting the relay opening coil associated with the one transit drum and energising in the relay coil associated with the next transit drum.

It will be appreciated from the foregoing that important features of the invention are the combination with the record drum 12 of the receiving recorders 1 to which signals selected from the drum 12 are transmitted through the medium of the transducing magnet **20*b*, the signals being transmitted under the control of the electronic gate 121, the selection of the items to be recorded on a recorder 1 being obtained by engaging the drum 12 with the advanced scanning magnet 20*a* operating in advance of the transducing magnet 20*b* and presetting the selector comprising the network 111—113 of Figure 6 by the manually adjusted switches 115 to select one out of the possible symbol values transmitted to the selector from the advanced scanning magnet 26*a*, the application of a signal to the receiving drum being effected by the cyclical switch means 62—66 which is correlated with the movement of the continuously moving magnetic recorder 12. It will be seen that the electronic gate 121 is thus subject to control of the switch which is adjustable to correspond with any predetermined symbol position, the selector means 111—113 and the cyclical switch means 62—66**.

I claim:

1. In record controlled recording apparatus for sorting or grouping data comprising items each containing the same number of symbols, a receiving record member, and means scanning said receiving record member, where items are recorded on the said receiving member followed by two or three gaps of item length, to provide information as to the location of a gap and means using such information to suppress further recording except in the first gap following a recorded item.

2. In record controlled recording apparatus for sorting or grouping data comprising items each containing the same number of symbols, selective means adapted adjustably to respond to predetermined symbols of an item in order to be rendered operative to select an item according as the said symbols have prescribed values; means to cause said selective means, when rendered operative; to remain operative for the duration of two, three or four successive items in order that the said two, three or four items may be grouped as a single item, and switch means determining the number of items to be thus grouped together.

3. In record controlled recording apparatus for sorting data in the form of items of constant length, each such item being formed by the same number of symbols: a transmitting record on which said items are recorded, means for moving said transmitting member continuously, a transmitting magnet deriving a signal from said transmitting record, a gate to which said signal is passed, at least one receiving magnet connected to said gate to receive the output therefrom, a receiving recorder associated with each said receiving magnet to receive a record therefrom, a scanning magnet associated with said transmitting member and located upstream of said transmitting magnet to provide a scanning signal, means passing said scanning signal to selective means adapted to provide a control signal in the event that (*a*) a predetermined symbol has a predetermined value and (*b*) there is no scanning signal due to the passage of a gap under said scanning magnet, and means passing said control signal to said gate to open the same and render said receiving recorder effective, whereby (*a*) items in which the predetermined symbol has the predetermined value and (*b*) gaps between items are both reproduced on the, or each receiving recorder.

4. In record controlled recording apparatus for sorting or grouping data comprising items each consisting of the same number of symbols recorded sequentially, a continuously moving magnetic recorder on which said items are recorded, an electronic gate, a magnetic recorder, a transducing magnet adapted to transmit items under the control of said electronic gate to said magnetic recorder, a switch adjustable to correspond to any predetermined symbol position within the item, an advanced scanning magnet upstream of the said transducing magnet, a preset selector, means to adjust the said preset selector to select one out of the possible symbol values transmitted to it from the said advanced scanning magnet, and cyclical switch means correlated with the movement of the continuously moving magnetic recorder aforesaid, the said gate being subject to the joint control of (1) the said first mentioned switch, (2) the said preset selector and (3) the said cyclical switch means, providing timing signals to mark substantially the beginning and the end of the passage of an item under the transducing magnet aforesaid, the electronic gate being thereby adapted to permit the transmission of a whole item from the transducer magnet aforesaid to a recorder, if and only if that symbol of the item which corresponds to the setting of the switch has a value which corresponds to the setting of the selector aforesaid.

5. In record controlled recording apparatus as claimed in claim 4, a recording magnet, the provision in addition to the said magnetic recorder of a continuously rotating record member functioning in conjunction with the said recording magnet and moving in correlation with the said magnetic recorder, a variable feed screw means to feed translatively said recording magnet, means to bring said feed screw means at one point in each complete rotation substantially to rest or to a very low speed relative to normal without any discontinuity of motion, so that the track record is spiral or helical having a form determined by the variable rate of rotation of the feed screw means and the fact that it comes substantially to rest or achieves a very low speed, in a continuous manner, at one point during each revolution.

6. In record controlled recording apparatus as claimed in claim 4, a recording magnet, the provision in addition to the said magnetic recorder of a continuously rotating record member functioning in conjunction with the said recording magnet and moving in correlation with the said magnetic recorder, a variable feed screw means to feed translatively said recording magnet, means to bring said feed screw means at one point in each complete rotation substantially to rest or to a very low speed relative to normal without any discontinuity of motion, clutch means through which the said screw means is driven, means by which the clutch means is controlled by the electronic gate means to engage and disengage the clutch means only when the screw means is substantially at rest or moving very slowly in comparision with its average speed, the instants of engagement and disengagement corresponding substantially to the beginning and end of the passage of an item under the transducing magnet.

7. Record controlled recording apparatus for sorting or grouping data as claimed in claim 4, including a multiplicity of transit record means and a receiving record means together with means to transit all items from each transit record means successively to the receiving record means, means for creating gas of at least one item's length on the receiving record member following the matter reproduced from each individual transit record means, and switch means determining the number of such gaps.

8. In record controlled recording apparatus for sorting or grouping data as in claim 4, a plurality of transit recorders with each of which is adjustably associated at least one additional transit recorder, and means to bring an associated additional transit recorder into effective operation when one of the said transit recorders becomes full.

9. In record controlled recording apparatus for sorting or grouping data comprising items each consisting of the same number of symbols recorded sequentially, a transmitting record means on which said symbols are recorded, transmitting means, a multiplicity of transit record means and receiving record means and selective means therewith, a switch, advanced scanning means distinct from said transmitting means and adapted to control the functioning of the transmitting means adjustably in response to any prescribed symbol of an item determined by the setting of the switch in order to transmit each item to an appropriate one of the said transit record means in accordance with the value of the said prescribed symbol, a receiving recording member, and means to transmit all items from each transit record means successively to said receiving record member, and means to move said receiving member at constant speed in correlation with the whole multiplicity of transit record means during said transmission, said transmission means including means adapted to control the onset of transmission from each successive transit means in order to provide a uniform arrangement of all selected items on the said receiving record member.

10. In record controlled recording apparatus for sorting or grouping data comprising items each having the same number of symbols, a transit record member a receiving record member, an advanced scanning magnet and a distinct recording magnet in conjunction with a cyclical timing means adapted to produce timing signals corresponding substantially to the beginning and the end of the passage of an item under the said recording magnet, means in conjunction with said advanced scanning magnet and cyclical timing means to suppress the recording of a whole item if there is already a record on the appropriate part of the receiving record member and to postpone recording until a gap is reached when recording can occur, said latter means which operates in conjunction with the scanning and cyclical timing means comprising an advanced receiving amplifier and valve means controlled from the advanced scanning magnet and electrically operated clutch means with said transit record member actuated to bring the transit record member into and out of operation, said valve means striking only when there is a gap under the advanced scanning magnet to connect the said clutch to a source of e.m.f. to bring the transit record member into operation.

11. Record controlled recording apparatus for sorting data in the form of items of constant length to transfer such items selectively to a record receiver wherein such items are recorded with gaps equivalent to more than an item length, comprising a primary record containing the items to be sorted, a transmitting magnet associated with said primary record and having an output, a record receiver, a scanning magnet associated with said record receiver and having an output when a recorded item passes thereunder, a receiving magnet associated with such record receiver and connected to receive the output of said transmitting magnet to record an item on said record receiver, and a switch controlled by the output from said scanning magnet interposed between said transmitting and receiving magnets to render said record receiver effective whereby recording of an item only takes place in a gap.

References Cited in the file of this patent

UNITED STATES PATENTS

| | | |
|---|---|---|
| 2,431,739 | Eilenberger | Dec. 2, 1947 |
| 2,594,731 | Connally | Apr. 29, 1952 |
| 2,597,866 | Gridley | May 27, 1952 |
| 2,614,169 | Cohen | Oct. 14, 1952 |
| 2,617,704 | Mallina | Nov. 11, 1952 |
| 2,679,638 | Bensky | May 25, 1954 |

OTHER REFERENCES

"Sorting and Collating," by John W. Mauchly in Theory and Techniques for Desgin of Electronic Digital Computers, published by University of Pennsylvania Moore School of Electrical Engineering, June 30, 1948 (pages 22–1 through 22–20).